United States Patent
Dao

(10) Patent No.: US 12,238,571 B2
(45) Date of Patent: Feb. 25, 2025

(54) TRACKING QoS VIOLATED EVENTS

(71) Applicant: HUAWEI TECHNOLOGIES CO., LTD., Shenzhen (CN)

(72) Inventor: Ngoc Dung Dao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/146,251

(22) Filed: Dec. 23, 2022

(65) Prior Publication Data

US 2023/0138587 A1 May 4, 2023

Related U.S. Application Data

(63) Continuation of application No. 17/232,733, filed on Apr. 16, 2021, now Pat. No. 11,595,845, which is a continuation of application No. 16/274,769, filed on Feb. 13, 2019, now Pat. No. 10,986,528.

(60) Provisional application No. 62/631,113, filed on Feb. 15, 2018.

(51) Int. Cl.
| | |
|---|---|
| H04W 28/02 | (2009.01) |
| H04L 12/14 | (2006.01) |
| H04W 76/12 | (2018.01) |
| H04W 76/27 | (2018.01) |
| H04W 80/10 | (2009.01) |

(52) U.S. Cl.
CPC ......... *H04W 28/0268* (2013.01); *H04L 12/14* (2013.01); *H04W 28/0236* (2013.01); *H04W 76/12* (2018.02); *H04W 76/27* (2018.02); *H04W 80/10* (2013.01)

(58) Field of Classification Search
CPC . H04W 28/0268; H04W 76/12; H04W 76/27; H04W 80/10; H04W 28/0236; H04L 12/14
See application file for complete search history.

(56) References Cited

U.S. PATENT DOCUMENTS

| | | | |
|---|---|---|---|
| 9,705,769 B1 | 7/2017 | Sarangapani et al. | |
| 10,986,516 B2 * | 4/2021 | Dao | H04W 72/535 |
| 2008/0212517 A1 | 9/2008 | Thesling | |
| 2010/0074383 A1* | 3/2010 | Lee | H04J 3/0667 |
| | | | 709/208 |

(Continued)

FOREIGN PATENT DOCUMENTS

| | | |
|---|---|---|
| CN | 101437268 B | 4/2013 |
| CN | 103857052 A | 6/2014 |

(Continued)

OTHER PUBLICATIONS

Ericsson, QoS Framework: Proposal on an Interim Agreement on Flow Priority. SA WG2 Meeting #118, Nov. 14, 18, 2016, Reno, Nevada, USA, S2-166394, 6 pages.

(Continued)

*Primary Examiner* — Shukri Taha

(57) ABSTRACT

A method in a network node comprises: detecting a Quality of Service (QoS) Violated Event in respect of a particular QoS flow of a Protocol Data Unit (PDU) session; and sending a corresponding QoS violated event report to any one or more of: a Session Management Function (SMF) of the network; a Policy Control Function (PCF) of the network; an Application Function (AF) of the network; and a third party service provider.

24 Claims, 13 Drawing Sheets

(56) References Cited

U.S. PATENT DOCUMENTS

| | | | | |
|---|---|---|---|---|
| 2017/0289046 | A1* | 10/2017 | Faccin | H04W 28/0268 |
| 2017/0302548 | A1 | 10/2017 | Sarangapani et al. | |
| 2019/0007291 | A1* | 1/2019 | Yi | H04W 24/08 |
| 2019/0191330 | A1* | 6/2019 | Dao | H04L 69/22 |
| 2019/0215731 | A1* | 7/2019 | Qiao | H04W 24/10 |
| 2020/0120570 | A1* | 4/2020 | Youn | H04W 76/11 |
| 2020/0260317 | A1* | 8/2020 | Francini | H04W 80/02 |
| 2020/0389407 | A1* | 12/2020 | Pasio | H04W 28/0236 |

FOREIGN PATENT DOCUMENTS

| | | |
|---|---|---|
| CN | 106470483 A | 3/2017 |
| CN | 106954203 A | 7/2017 |
| WO | 2018006773 A1 | 1/2018 |

OTHER PUBLICATIONS

Huawei, HiSilicon, TS23.502: Clarification about QoS flow management in PDU session related procedures. SA WG2 Meeting #124, Nov. 27-Dec. 1, 2017, Reno, Nevada, USA, S2-178624, 34 pages.

Huawei, HiSilicon, TS23.501: QoS control for unstructured PDU session. SA WG2 Meeting #122Bis, Aug. 21-25, 2017, Sophia Antipolis, France, S2-175613, 9 pages.

Huawei, HiSilicon, TS23.502: Clarification about QoS flow management in PDU session related procedures. SA WG2 Meeting #124, Nov. 27-Dec. 1, 2017, Reno, Nevada, USA, S2-179373, 33 pages.

Qualcomm Incorporated, GBR flow considerations. 3GPP TSG-RAN WG2 Meeting #96, Reno, US, 14 Nov. 18, 2016, R2-168615, 3 pages.

System Architecture for the 5G System; Stage 2; 3GPP TS 23.501 V2.0.1 (Dec. 2017).

Procedures for the 5G System; Stage 2; 3GPP TS 23.502 V2.0.0 (Dec. 2017).

Policy and Charging Control Framework for the 5G System; Stage 2; 3GPP TS 23.503 V1.0.0 (Dec. 2017).

General Packet Radio System (GPRS) Tunnelling Protocol User Plane (GTPv1-U); 3GPP TS 29.281 V15.1.0 (Dec. 2017.

Huawei et al., Correction on Notification Control for GBR QoS flow. 3GPP TSG-SA WG2 Meeting #125 Gothenburg, Sweden, Jan. 22-Jan. 26, 2018, S2-180309, 12 pages.

LG Electronics et al, TS 23.501: Deactivation of the derived QoS rule. SA WG2 Meeting #120 Mar. 27-31, 2017, Busan, South Korea, S2-172370, 3 pages.

Ericsson,"23.503: AF subscription to QoS notification control",SA WG2 Meeting #124, S2-179228, Nov. 27-Dec. 1, 2017, Reno, Nevada (USA), total 2 pages.

3GPP TS 23.203 V15.1.0 (Dec. 2017),3rd Generation Partnership Project;Technical Specification Group Services and System Aspects;Policy and charging control architecture(Release 15), total 260 pages.

3GPP TS 23.501 V15.0.0 (Dec. 2017), 3rd Generation Partnership Project; Technical Specification Group Services and System Aspects; System Architecture for the 5G System; Stage 2(Release 15), 181 pages.

Huawei, HiSilicon, Correction on Notification Control for GBR QoS flow. 3GPP TSG-SA WG2 Meeting #125, Gothenburg, Sweden, Jan. 22 Jan. 26, 2018, S2-180309, 12 pages.

Huawei, Clarification on information in PCC Rule level and Session Level Policy Control. 3GPP TSG-CT WG3 Meeting #92, Kochi, India, Oct. 23-27, 2017, C3-175316, 6 pages.

* cited by examiner

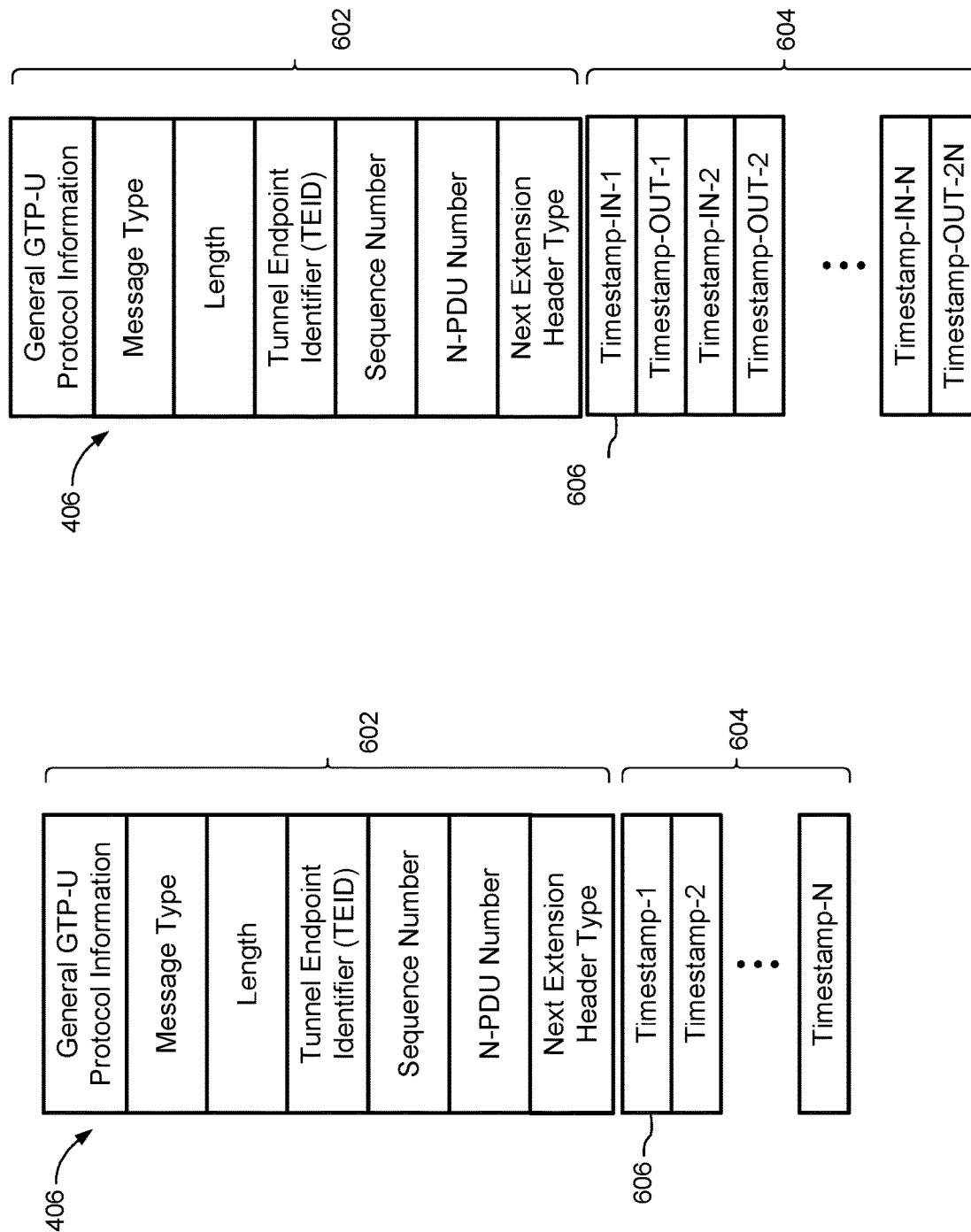

TRACKING QoS VIOLATED EVENTS

CROSS-REFERENCE TO RELATED APPLICATIONS

This application is a continuation of U.S. patent application Ser. No. 17/232,733, filed on Apr. 16, 2021, which a continuation of U.S. patent application Ser. No. 16/274,769, entitled "TRACKING QOS VIOLATED EVENTS" filed Feb. 13, 2019 and claims the benefit of priority to U.S. Provisional Application Ser. No. 62/631,113, filed Feb. 15, 2018, the contents of which are hereby incorporated by reference.

FIELD OF THE INVENTION

The present invention pertains to the field of network management, and in particular to tracking QoS violated events.

BACKGROUND

Ultra-Reliable Low Latency Communications (URLLC) applications, such as industrial automation control and automated driving vehicles, for example, require ultra reliable packet delivery. The Third Generation Partnership Project (3GPP) has developed in Release 15 a new Quality of Service (QoS) model, which includes a delay critical Guaranteed Bit Rate (GBR) QoS resource type. A new QoS parameter, which may be referred to as Maximum Data Burst Volume, has been added for delay critical GBR QoS flows.

The packets of delay critical GBR QoS flows may belong to applications that are very sensitive to packet delays. For these applications, the violation of QoS requirements, such as packet delay beyond a particular value, may lead to serious issues in the applications in the User Equipment (UE) side. In order to address issues raised by customer owned UEs, the network operator may need to refer to records (such as audit trails) of network events.

The current 5G QoS model has a "Notification Control" parameter configured by the Policy Control Function (PCF) for a (Radio) Access Network ((R)AN) node to send a notification to the Access and Mobility Management Function (AMF) when the Guaranteed Flow Bit Rate (GFBR) can not be supported. This notification does not help to report events in which the QoS parameters of delay critical GBR QoS flows are violated.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide techniques for reporting events in which the QoS parameters of delay critical GBR QoS flows are violated.

Accordingly, an aspect of the present invention provides a method in a network node comprises: detecting a quality of service (QoS) Violated Event in respect of a particular protocol data unit (PDU) session; and sending a corresponding report to a session management function (SMF) of the network.

In another broad aspect, a method in a network node is provided, comprising: receiving a configuration indicating how to report a QoS violated event; detecting a quality of service (QoS) violated event in respect of a particular QoS flow of protocol data unit (PDU) session; and sending, to a session management function (SMF) of the network, a report corresponding to the detected QoS violated event according to the configuration.

In one aspect, the network node comprises one of:
a radio access network (RAN) node connected to a user equipment (UE) associated with the PDU session; and
a user plane function (UPF) associated with the PDU session.

In another aspect, the method further comprises receiving a policy and charging control (PCC) rule, wherein the configuration is based on the PCC rule.

In yet another aspect, the method comprises receiving a request to include a timestamp associated with a packet delay parameter in accordance with detected QoS violated event, the timestamp including at least one of a packet delay and a time that the packet delay is initiated.

In one variation, detecting the QoS violated event comprises detecting one or more of:
a measured packet delay is larger than a predetermined user plane function (UPF) packet delay budget (PDB);
a measured data burst volume within a period of the UPF PDB is larger than a predetermined maximum data burst volume;
a measured flow bitrate within a predetermined averaging window is larger than a predetermined maximum flow bit rate (MFBR);
the UPF cannot support a predetermined guaranteed flow bit rate (GFBR);
a measured session-aggregate maximum bit rate (Session-AMBR) is larger than an authorized session-AMBR; and
a measured UE-AMBR is larger than a predetermined subscribed UE-AMBR.

In yet another aspect, the report comprises one or more of:
an event identifier;
a network Function identifier;
a user equipment (UE) identifier;
an application identifier;
a packet filter;
a PDU session identifier;
a QoS flow identifier (QFI);
a packet delay budget (PDB) indication;
one or more timestamps;
a measured packet delay in packet session anchor (PSA) UPF;
a size of a particular PDU in respect of which the QoS violated event was detected; and
a copy of the particular PDU.

In one aspect, sending the report comprises one or more of:
sending the report immediately following detection of the QoS violated event;
storing one or more reports in a memory, and sending the one or more reports at a predetermined interval; and
storing one or more reports in a memory, and sending the one or more reports in response to a predetermined event.

In one variation, the predetermined event comprises any one or more of:
predetermined intervals;
a user plane (UP) of the PDU session is deactivated;
the PDU session is released;

the UE enters a CM-IDLE state; and
the UE transitions from a CM-CONNECTED state to an RRC-INACTIVE state.

In one aspect, the configuration is obtained by the SMF upon establishment or modification of the PDU session.

In another aspect, the method further comprises:
receiving, at a policy control function (PCF), the QoS violated event report;
receiving, from an application function of the network, a request for the QoS violated event report; and
sending, via one of directly and indirectly, the QoS violated event report to the AF.

In another embodiment, the method further comprises sending the QoS violated event report via a network exposure function (NEF) of the network.

In a broad aspect, a method comprises obtaining, at a session management function (SMF) from a policy control function (PCF), a configuration indicating how to report a packet delay event, the condition being associated with the packet delay parameter which applies to at least one of a radio access network (RAN) node, a user plane function (UPF), and a user equipment (UE), transmitting, by the SMF to the at least one of the RAN node, the UPF and the UE, the configuration, receiving, by the SMF from the at least one of the RAN node, the UPF and the UE, a packet delay event report generated in accordance with the configuration.

In one variation, the configuration is obtained by the SMF upon establishment or modification of the PDU session.

In another variation, the method further comprises requesting the at least one of the RAN node, the UPF and the UE to include a timestamp associated with the packet delay parameter to at least one protocol data unit (PDU) during a PDU session between the UE and a network function (NF).

In another aspect, the timestamp specifies at least one of an arrival time at the NF and at the UE, a departure time from the NF and from the UE, and times of arrival and departure at the NF.

In yet another aspect, the packet delay event report including at least one of a measured packet delay of individual PDUs for quality of service (QoS) flows and an average packet delay of QoS flows for at least one of an uplink (UL) and a downlink (DL) transmission.

In another variation, the method further comprises receiving a policy and charging control (PCC) rule, the configuration is obtained based on the PCC rule.

In yet another variation, the method further comprises transmitting, by the SMF, the packet delay event report to the PCF.

In another aspect, the method further comprises determining, by the SMF, whether a packet delay violation is detected according to the packet delay event report.

In yet another broad aspect, a network node is provided, comprising:
a processor; and
a memory storing instructions executable in the processor by:
receiving a configuration indicating how to report a QoS violated event;
detecting a quality of service (QoS) violated event in respect of a particular protocol data unit (PDU) session; and
sending, to a session management function (SMF) of the network, a report corresponding to the detected QoS violated even according to the configuration.

In one aspect, the network node is one of a radio access network (RAN) node connected to a user equipment (UE) associated with the PDU session, and a user plane function (UPF) associated with the PDU session.

In one variation, the network node further comprises instructions executable for receiving a policy and charging control (PCC) rule, wherein the configuration is based on the PCC rule.

In yet another variation, the network node further comprises instructions executable for receiving a request to include a timestamp associated with a packet delay parameter in accordance with detected QoS violated event.

In one aspect, detecting the QoS violated event comprises detecting one or more of:
a measured packet delay is larger than a predetermined user plane function (UPF) packet delay budget (PDB);
a measured data burst volume within a period of the UPF PDB is larger than a predetermined maximum data burst volume;
a measured flow bitrate within a predetermined averaging window is larger than a predetermined maximum flow bit rate (MFBR);
the UPF cannot support a predetermined guaranteed flow bit rate (GFBR);
a measured session-aggregate maximum bit rate (Session-AMBR) is larger than an authorized session-AMBR; and
a measured UE-AMBR is larger than a predetermined subscribed UE-AMBR.

In one variation, the report comprises one or more of:
an event identifier;
a network function identifier;
a user equipment (UE) identifier;
an application identifier;
a packet filter;
a PDU session identifier;
a QoS flow identifier (QFI);
a packet delay budget (PDB) indication;
one or more timestamps;
a measured packet delay in packet session anchor (PSA) UPF;
a size of a particular PDU in respect of which the QoS violated event was detected; and a copy of the particular PDU.

In one aspect, sending the report comprises one or more of:
sending the report immediately following detection of the QoS violated event;
storing one or more reports in a memory, and sending the one or more reports at a predetermined interval; and
storing one or more reports in a memory, and sending the one or more reports in response to a predetermined event.

In one aspect, the predetermined event comprises any one or more of:
predetermined intervals;
a user plane (UP) of the PDU session is deactivated;
the PDU session is released;
the UE enters a CM-IDLE state; and
the UE transitions from a CM-CONNECTED state to an RRC-INACTIVE state.

In another broad aspect, provided is a session management function (SMF) comprising:
a processor; and
a memory storing instructions executable in the processor by:
obtaining, from a policy control function (PCF), a configuration indicating how to report a packet delay event, the condition being associated with the packet delay parameter which applies to at least one of a radio access network (RAN) node, a user plane function (UPF), and a user equipment (UE);

transmitting, to the at least one of the RAN node, the UPF and the UE, the configuration; and receiving, from the at least one of the RAN node, the UPF and the UE, a packet delay event report generated in accordance with the configuration.

In one aspect, the configuration is obtained by the SMF upon establishment or modification of the PDU session.

In another aspect, the function further comprises instructions executable for requesting the at least one of the RAN node, the UPF and the UE to include a timestamp associated with the packet delay parameter to at least one protocol data unit (PDU) during a PDU session between the UE and a network function (NF).

In one variation, the timestamp specifies at least one of an arrival time at the NF and at the UE, a departure time from the NF and from the UE, and times of arrival and departure at the NF.

In another variation, the packet delay event report includes at least one of a measured packet delay of individual PDUs for quality of service (QoS) flows and an average packet delay of QoS flows for at least one of an uplink (UL) and a downlink (DL) transmission.

In one aspect, the instructions are executable for receiving a policy and charging control (PCC) rule, the configuration is obtained based on the PCC rule.

In another aspect, the instructions are executable for transmitting the packet delay event report to the PCF.

In a further aspect, the instructions are executable for determining whether a packet delay violation is detected according to the packet delay event report.

Provided, in another broad aspect, is a method comprising:

receiving, at a user plane function (UPF) during a protocol data unit (PDU) session, a packet destined for a user equipment (UE); and encapsulating the packet to include a first timestamp indicating a time of arrival of the packet at the UPF.

In one variation, the method further comprises encapsulating the packet to further include a second timestamp indicating a time transmission of the packet from the UPF.

In one aspect, the UPF is a first UPF in a plurality of UPFs of the network, and the method further comprises:

calculating an accumulation of timestamps based on the a first and the second timestamps of each of the plurality of UPFs; and determining occurrence of a QoS violation event based on the accumulation of timestamps.

In one variation, the timestamp is carried by one of: a field of a GTP-U protocol, and an Extension Header field of a GTP-U protocol having a Next Extension Header Type that indicates a new timestamp type.

Also provided, in a broad aspect, is a network node comprising a processor; and a memory storing instructions executable in the processor by:

receiving during a protocol data unit (PDU) session, a packet destined for a user equipment (UE); and encapsulating the packet to include a first timestamp indicating a time of arrival of the packet at the network node.

In one variation, the instructions are further executable to encapsulate the packet to further include a second timestamp indicating a time transmission of the packet from the network node.

In one variation, the network node is a first network node in a plurality of network nodes of the network, and the instructions are further executable to:

calculate an accumulation of timestamps based on the a first and the second timestamps of each of the plurality of network nodes; and determine occurrence of a QoS violation event based on the accumulation of timestamps.

In one variation, the timestamp is carried by one of: a field of a GTP-U protocol, and an Extension Header field of a GTP-U protocol having a Next Extension Header Type that indicates a new timestamp type.

In another variation, the network node is a user plane function (UPF).

Also provided, in a broad aspect, is a non-transitory computer-readable media storing computer instructions, that when executed by one or more processors, cause the one or more processors to perform any of the preceding methods.

In another broad aspect, provided is a communication system comprising at least one of a network node configured to perform selected ones of the preceding methods, a session management function (SMF) configured to perform selected ones of the preceding methods, and a network node configured to perform selected ones of the preceding methods.

BRIEF DESCRIPTION OF THE FIGURES

Further features and advantages of the present invention will become apparent from the following detailed description, taken in combination with the appended drawings, in which:

FIG. 6 is a block diagram schematically illustrating a representative format of the N3/N9 Encapsulation header of FIG. 5, in accordance with representative embodiments of the present invention;

FIG. 8 is a block diagram schematically illustrating another representative format of the N3/N9 Encapsulation header of FIG. 5, which may be used in embodiments of the present invention;

It will be noted that throughout the appended drawings, like features are identified by like reference numerals.

DETAILED DESCRIPTION

In the following description, features of the present invention are described by way of example embodiments. For convenience of description, these embodiments make use of features and terminology known from communication system specifications, such as 4G and 5G networks, as defined by the Third Generation Partnership Project (3GPP). However, it may be understood that the present invention is not limited to such networks.

In the following description, the term "QoS violated event" is used to refer to an event in which one or more parameters of a QoS agreement have been violated. Embodiments of the present invention are agnostic with respect to the cause of a QoS violated event. For example, a QoS violated event may be caused by the network (e.g. due to a lack of available capacity at a particular time) or by a client (e.g. due to an application transmitting an excessively large amount of data in a given time period). The mobile network operators may detect the QoS violated events in order to identify the network functions or network segments that cause the QoS violation so that suitable remedy solutions can be implemented. The mobile network operator may also re-negotiate with the client to change the QoS agreements.

Figure 1:
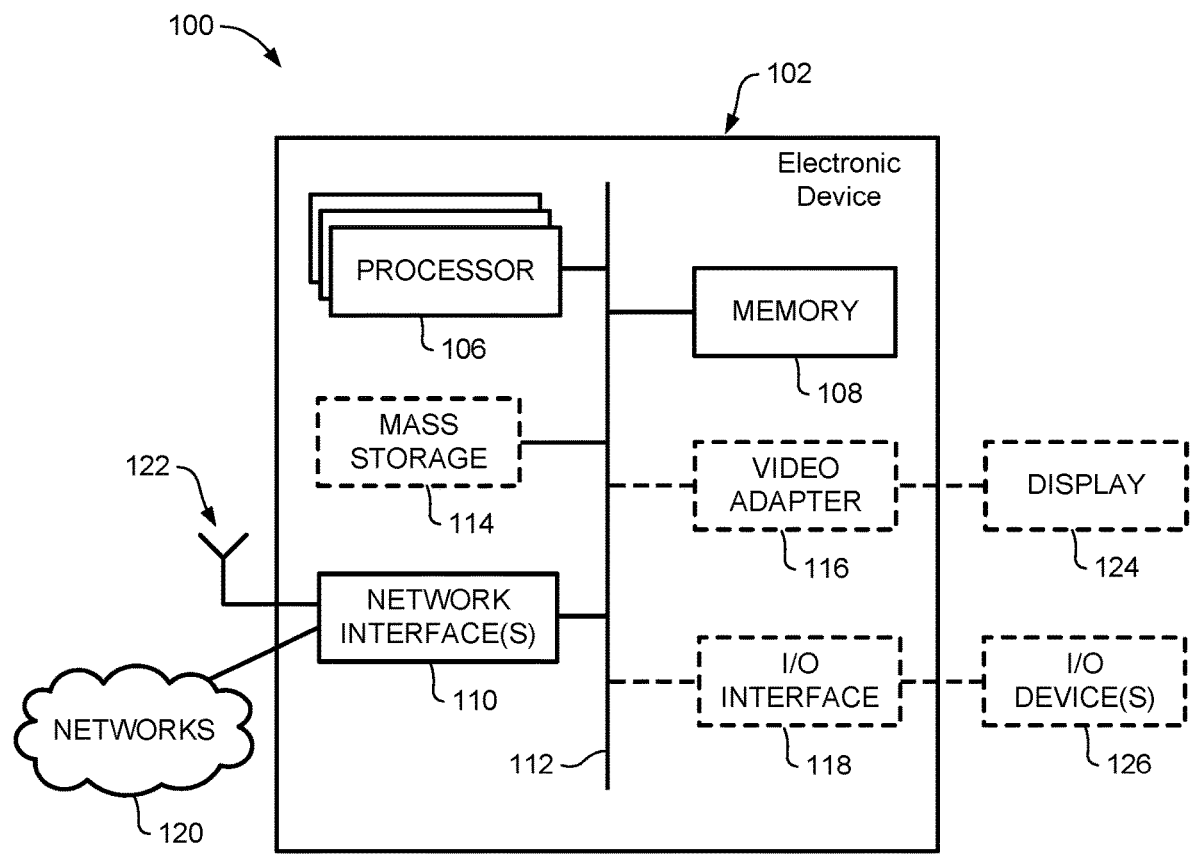
FIG. 1 is a block diagram of an electronic device within a computing and communications environment that may be used for implementing devices and methods in accordance with representative embodiments of the present invention.

FIG. 1 is a block diagram of an electronic device (ED) 102 illustrated within a computing and communications environment 100 that may be used for implementing the devices and methods disclosed herein. In some embodiments, the electronic device 102 may be an element of communications network infrastructure, such as a base station (for example a NodeB, an enhanced Node B (eNodeB), a next generation NodeB (sometimes referred to as a gNodeB or gNB)), a home subscriber server (HSS), a gateway (GW) such as a packet gateway (PGW) or a serving gateway (SGW) or various other nodes or functions within an evolved packet core (EPC) network. In other embodiments, the electronic device 102 may be a device that connects to network infrastructure over a radio interface, such as a mobile phone, smart phone or other such device that may be classified as a User Equipment (UE). In some embodiments, ED 102 may be a Machine Type Communications (MTC) device (also referred to as a machine-to-machine (m2m) device), or another such device that may be categorized as a UE despite not providing a direct service to a user. In some references, an ED 102 may also be referred to as a mobile device (MD), a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 106, such as a Central Processing Unit (CPU), and may further include specialized processors such as a Graphics Processing Unit (GPU) or other such processor, a memory 108, a network interface 110 and a bus 112 to connect the components of ED 102. ED 102 may optionally also include components such as a mass storage device 114, a video adapter 116, and an I/O interface 118 (shown in dashed lines).

The memory 108 may comprise any type of non-transitory system memory, readable by the processor 106, such as static random-access memory (SRAM), dynamic random access memory (DRAM), synchronous DRAM (SDRAM), read-only memory (ROM), or a combination thereof. In specific embodiments, the memory 108 may include more than one type of memory, such as ROM for use at boot-up, and DRAM for program and data storage for use while executing programs. The bus 112 may be one or more of any type of several bus architectures including a memory bus or memory controller, a peripheral bus, or a video bus.

The electronic device 102 may also include one or more network interfaces 110, which may include at least one of a wired network interface and a wireless network interface. As illustrated in FIG. 1, network interface 110 may include a wired network interface to connect to a network 120, and also may include a radio access network interface 122 for connecting to other devices over a radio link. When ED 102 is network infrastructure, the radio access network interface 122 may be omitted for nodes or functions acting as elements of the Core Network (CN) other than those at the radio edge (e.g. an eNB). When ED 102 is infrastructure at the radio edge of a network, both wired and wireless network interfaces may be included. When ED 102 is a wirelessly connected device, such as a User Equipment, radio access network interface 122 may be present and it may be supplemented by other wireless interfaces such as WiFi network interfaces. The network interfaces 110 allow the electronic device 102 to communicate with remote entities such as those connected to network 120.

The mass storage 114 may comprise any type of non-transitory storage device configured to store data, programs, and other information and to make the data, programs, and other information accessible via the bus 112. The mass storage 114 may comprise, for example, one or more of a solid-state drive, hard disk drive, a magnetic disk drive, or an optical disk drive. In some embodiments, mass storage 114 may be remote to the electronic device 102 and accessible through use of a network interface such as interface 110. In the illustrated embodiment, mass storage 114 is distinct from memory 108 where it is included, and may generally perform storage tasks compatible with higher latency, but may generally provide lesser or no volatility. In some embodiments, mass storage 114 may be integrated with a memory 108 to form an heterogeneous memory.

The optional video adapter 116 and the I/O interface 118 (shown in dashed lines) provide interfaces to couple the electronic device 102 to external input and output devices. Examples of input and output devices include a display 124 coupled to the video adapter 116 and an I/O device 126 such as a touch-screen coupled to the I/O interface 118. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 118 and Video Adapter 116 may be virtualized and provided through network interface 110.

In some embodiments, electronic device 102 may be a standalone device, while in other embodiments electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 2:
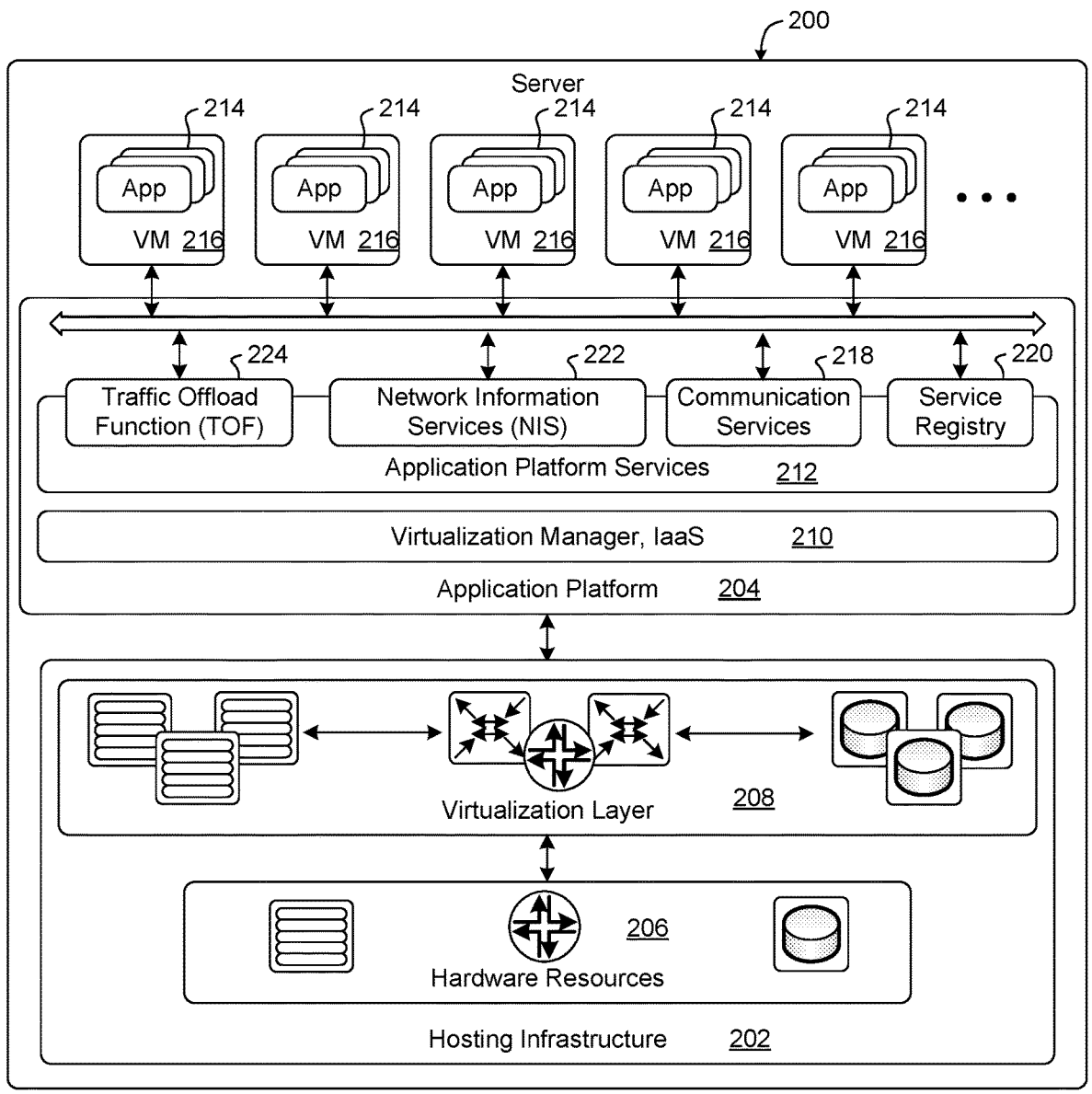
FIG. 2 is a block diagram illustrating a logical platform under which an Electronic Device can provide virtualization services.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 2 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP). The virtualization layer 208 and the application platform 204 may be collectively referred to as a Hypervisor.

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application being hosted by the platform 204. Each "sandbox" may be implemented as a Virtual Machine (VM) 216 that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed within a respective Virtual Machine 216. For example, MANagement and Orchestration (MANO) functions and Service Oriented Network Auto-Creation (SONAC) functions (or any of Software Defined Networking (SDN), Software Defined Topology (SDT), Software Defined Protocol (SDP) and Software Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside virtualized mobile network elements in data centers that are used for supporting the processing requirements of the Cloud-Radio Access Network (C-RAN). For example, eNodeB or gNB nodes may be virtualized as applications 214 executing in a VM 216. Network Information Services (NIS) 222 may provide applications 214 with low-level network information. For example, the information provided by NIS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 214 in various ways, including: A Pass-through mode where (either or both of uplink and downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

As may be appreciated, the server architecture of FIG. 2 is an example of Platform Virtualization, in which each Virtual Machine 216 emulates a physical computer with its own operating system, and (virtualized) hardware resources of its host system. Software applications 214 executed on a virtual machine 216 are separated from the underlying hardware resources 206 (for example by the virtualization layer 208 and Application Platform 204). In general terms, a Virtual Machine 216 is instantiated as a client of a hypervisor (such as the virtualization layer 208 and application-platform 204) which presents an abstraction of the hardware resources 206 to the Virtual Machine 216.

Other virtualization technologies are known or may be developed in the future that may use a different functional architecture of the server 200. For example, Operating-System-Level virtualization is a virtualization technology in which the kernel of an operating system allows the existence of multiple isolated user-space instances, instead of just one. Such instances, which are sometimes called containers, virtualization engines (VEs) or jails (such as a "FreeBSD jail" or "chroot jail"), may emulate physical computers from the point of view of applications running in them. However, unlike virtual machines, each user space instance may directly access the hardware resources 206 of the host system, using the host systems kernel. In this arrangement, at least the virtualization layer 208 of FIG. 2 would not be needed by a user space instance. More broadly, it will be recognised that the functional architecture of a server 200 may vary depending on the choice of virtualisation technology and possibly different vendors of a specific virtualisation technology.

Figure 3:
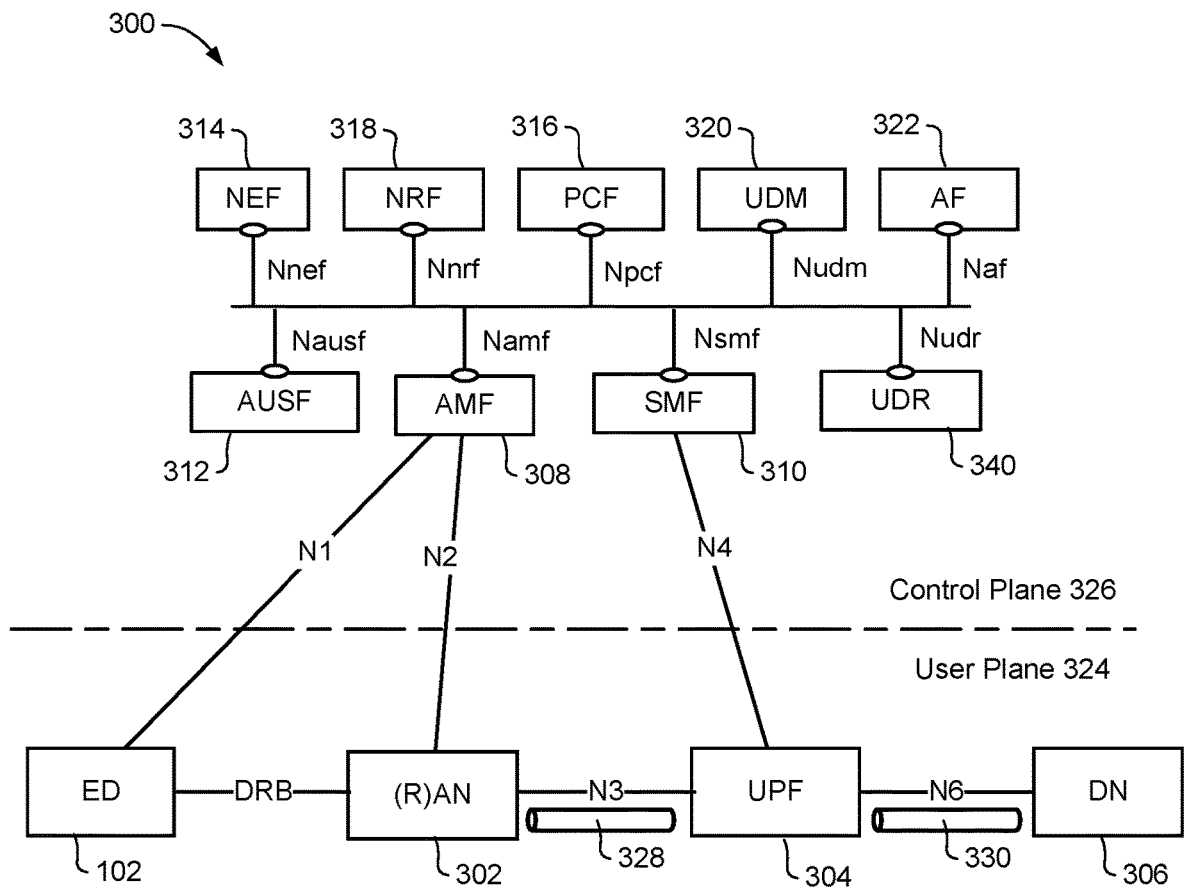
FIG. 3 is a block diagram illustrating a service-based view of a system architecture of a 5G Core Network.

FIG. 3 illustrates a service-based architecture 300 for a 5G or Next Generation Core Network (5GCN/NGCN/NCN). This illustration depicts logical connections between nodes and functions, and its illustrated connections should not be interpreted as direct physical connections. ED 102 forms a radio access network connection with a (Radio) Access Network ((R)AN) node 302 (which may, for example, be an gNodeB (gNB)), which is connected to a User Plane (UP) Function (UPF) 304 such as a UP Gateway over a network interface providing a defined interface such as an N3 interface. UPF 304 provides a logical connection to a Data Network (DN) 306 over a network interface such as an N6 interface. The radio access network connection between the ED 102 and the (R)AN node 302 may be referred to as a Data Radio Bearer (DRB).

DN 306 may be a data network used to provide an operator service, or it may be outside the scope of the standardization of the Third Generation Partnership Project (3GPP), such as the Internet, a network used to provide third party service, and in some embodiments DN 306 may represent an Edge Computing network or resource, such as a Mobile Edge Computing (MEC) network.

ED 102 also connects to the Access and Mobility Management Function (AMF) 308 through a logical N1 connection (although the physical path of the connection is not direct). The AMF 308 is responsible for authentication and authorization of access requests, as well as mobility management functions. The AMF 308 may perform other roles and functions as defined by the 3GPP Technical Specification (TS) 23.501. In a service based view, AMF 308 can communicate with other core network control plane functions through a service based interface denoted as Namf.

The Session Management Function (SMF) 310 is a network function that is responsible for the allocation and management of IP addresses that are assigned to a UE as well as the selection of a UPF 304 (or a particular instance of a UPF 304) for traffic associated with a particular session of ED 102. The SMF 310 can communicate with other core network functions, in a service based view, through a service based interface denoted as Nsmf. The SME 310 may also connect to a UPF 304 through a logical interface such as network interface N4.

The Authentication Server Function (AUSF) 312, provides authentication services to other network functions over a service based Nausf interface.

A Network Exposure Function (NEF) 314 can be deployed in the network to allow servers, functions and other entities such as those outside a trusted domain to have exposure to services and capabilities within the network. In one such example, an NEF 314 can act much like a proxy between an application server outside the illustrated network and network functions such as the Policy Control Function (PCF) 316, the SMF 310, the UDM 320, and the AMF 308, so that the external application server can provide information that may be of use in the setup of the parameters associated with a data session. The NEF 314 can communicate with other network functions through a service based Nnef network interface. The NEF 314 may also have an interface to non-3GPP functions.

A Network Repository Function (NRF) 318, provides network service discovery functionality. The NRF 318 may be specific to the Public Land Mobility Network (PLMN) or network operator, with which it is associated. The service discovery functionality can allow network functions and UEs connected to the network to determine where and how to access existing network functions, and may present the service based interface Nnrf.

PCF 316 communicates with other network functions over a service based Npcf interface, and can be used to provide Policy and Charging Control (PCC) functionality to other network functions, including those within the control plane. The PCC functionality may include: a Policy and Charging Rules Function (PCRF); a Policy and Charging Enforcement Function (PCEF); and a Bearer Binding and Event Reporting Function (BBERF). Implementation of PCC functionality is not necessarily the responsibility of the PCF 316, but rather is typically the responsibility of network functions to which the PCF 316 transmits applicable PCC rules. In one such example the PCF 316 may transmit a PCC rule (associated with a policy) associated with session management to the SMF 310, which may use the received PCC rule to implement the associated policy. This arrangement may be used to enable a unified policy framework within which network behavior can be governed.

A Unified Data Management Function (UDM) 320 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 320 may employ an interface Nudr to connect to a User Data Repository (UDR). The PCF 316 may be associated with the UDM 320 because it may be involved with requesting and providing subscription policy information to the UDR, but it should be understood that typically the PCF 316 and the UDM 320 are independent functions.

The PCF 316 may have a direct interface to the UDR. The UDM 320 can receive requests to retrieve content stored in the UDR 340, or requests to store content in the UDR 340. The UDM 320 is typically responsible for functionality such as the processing of credentials, location management and subscription management. The UDR 340 may also support any or all of Authentication Credential Processing, User Identification handling, Access Authorization, Registration/Mobility management, subscription management, and Short Message Service (SMS) management. The UDR is typically responsible for storing data provided by the UDM 320. The stored data is typically associated with policy profile information (which may be provided by PCF 316) that governs the access rights to the stored data. In some embodiments, the UDR may store policy data, as well as user subscription data which may include any or all of subscription identifiers, security credentials, access and mobility related subscription data and session related data.

Application Function (AF) 322 represents the non-data plane (also referred to as the non-user plane) functionality of an application deployed within a network operator domain and within a 3GPP compliant network. The AF 322 interacts with other core network functions through a service based Naf interface, and may access network capability exposure information, as well as provide application information for use in decisions such as traffic routing. The AF 322 can also interact with functions such as the PCF 316 to provide application specific input into policy and policy enforcement decisions. It should be understood that in many situations the AF 322 does not provide network services to other NFs, and instead is often viewed as a consumer or user of services provided by other NFs. An application outside the 3GPP network, can perform many of the same functions as AF 322 through the use of NEF 314.

ED 102 communicates with network functions that are in the User Plane (UP) 324, and the Control Plane (CP) 326. The UPF 304 is a part of the CN UP 324 (DN 306 being outside the 5GCN). (R)AN node 302 may be considered as a part of a User Plane, but because it is not strictly a part of the CN, it is not considered to be a part of the CN UP 324. AMF 308, SMF 310, AUSF 312, NEF 314, NRF 318, PCF 316, and UDM 320 are functions that reside within the CN CP 326, and are often referred to as Control Plane Functions. AF 322 may communicate with other functions within CN CP 326 (either directly or indirectly through the NEF 314), but is typically not considered to be a part of the CN CP 326.

Those skilled in the art will appreciate that there may be a plurality of UPFs connected in series between the (R)AN node 302 and the DN 306, and multiple data sessions to different DNs can be accommodated through the use of multiple UPFs in parallel.

User Plane (UP) packets flows to and from a particular ED 102. UP packets are normally routed between the (R)AN node 302 connected to the ED 102, and the DN 306 using General Packet Radio Service (GPRS) Tunneling Protocol for user plane (GTP-U) tunnels 328 and possibly IP-based tunnel 330 established through the N3 and N6 interfaces, respectively. In some examples, connections between (R)AN node 302 and a UPF 304 would make use of GTP-U tunnel 328. Connections between the illustrated UPF 304 and other unillustrated UPFs would also make sure of a GTP-U tunnel. Upon leaving the CN UP, a packet may make use of an Internet Protocol (IP)-based connection between the UPF and the DN 306 instead of a GTP-U tunnel, especially if DN 306 is outside the domain of the operator.

Optionally, a GTP-U tunnel 328 may be established between the (R)AN node 302 and the UPF 304 for each Radio Bearer between the ED 102 and the (R)AN node 302, which might allow for a one-to-one relationship between Radio Bearers and GTP-U tunnels. Where there is a second UPF, there would usually be a corresponding GTP-U tunnel between the UPFs for each GTP-U tunnel between the (R)AN node 302 and the UPF 304. This results in each radio bearer being associated with a set of GTP-U tunnels forming a path through the CN UP. Each GTP-U tunnel may support multiple PDU sessions, and packet flows with multiple different QoS requirements. Packet flows within a GTP-U tunnel, such as tunnel 328, having the same QoS requirements may be grouped together as a QoS Flow, which may be identified by a given QFI. The QFI can therefore be used for queuing and prioritization of packet forwarding through the GTP-U tunnels 328 and 330.

At the time of PDU session establishment, the SMF 310 typically provides one or more QoS Profiles to the (R)AN node 302. These QoS Profiles contain QoS parameters for controlling the forwarding of packets having various QoS requirements. Example QoS parameters that may be included in a QoS Profile may include: 5G QoS Identifier (5QI), Allocation and Retention Priority (ARP), Reflective QoS Attribute (RQA), Guaranteed Flow Bit Rate (GFBR), Maximum Flow Bit Rate (MFBR), and Notification Control parameters.

At the time of PDU session establishment, the SMF 310 typically provides one or more QoS Rules to the ED 102. These QoS Rules contain information for controlling the forwarding of packets having various QoS requirements. Example information that may be included in a QoS Rule may include: QoS Flow Identifier (QFI), one or more packet filters and precedence values, and QoS parameters (such as 5G QoS Identifier (5QI), Guaranteed Bit Rate (GBR), Maximum Bit Rate (MBR), etc.). During run-time, the ED 102 may insert the QFI into UpLink (UL) packets prior to sending them through the RB, such as data radio bearer (DRB), to the (R)AN node 302. Upon receipt of the UL packet from the ED 102, the (R)AN node 302 may use the QFI of the packet and the QoS Profiles to control queuing and transmission of the packet to the UPF 304.

As may be appreciated, there can be more than one QoS rule associated with a given QoS Flow. These QoS rules may contain the same QFI. In some cases, a Default QoS rule may be defined. The Default QoS rule may be the only QoS rule of a PDU session that does not contain a packet filter.

Embodiments of the present invention provide techniques for reporting QoS violated events pertaining to a particular PDU session, for example for a URLLC application. An objective is to enable the PCF 316 to provide QoS monitoring and QoS violated event reporting policy to the (R)AN 302 and UPF 304 for delay critical GBR QoS Flows, for example.

Since the QoS violated event reporting requires QoS monitoring, in the present document the phrase "QoS monitoring and QoS violated event reporting" may be also referred to as "QoS violated event reporting" for short. However, the QoS monitoring and QoS violated event reporting policy may require the QoS monitoring function in the network entities such as (R)AN UPF, and UE to report the measured QoS parameters, either when the QoS parameters are violated or not violated.

Figure 4:
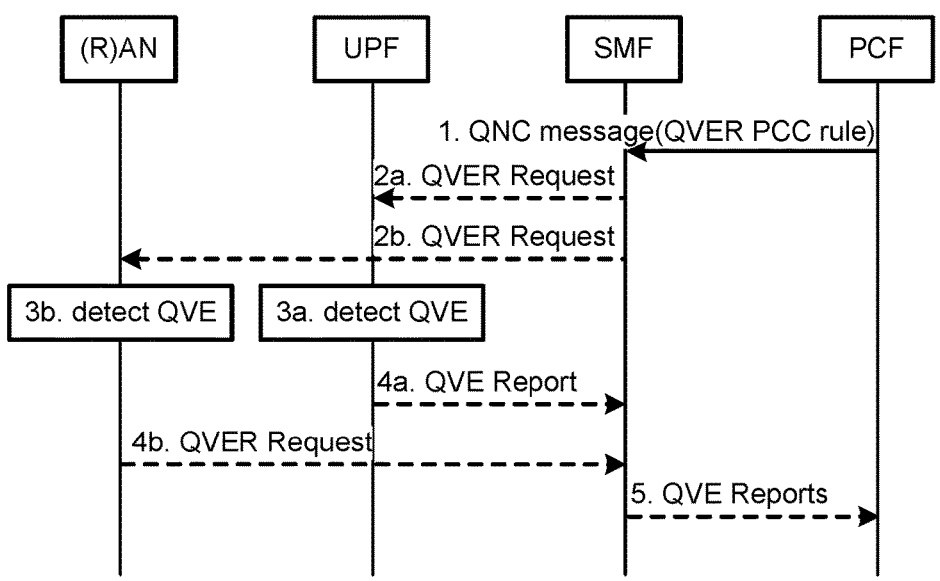
FIG. 4 is a message flow diagram illustrating a representative process in accordance with embodiments of the present invention.

Referring to FIG. 4, in some embodiments, the SMF 310 may be configured with QoS violated event reporting functionality by means of a PCC rule provided by the PCF 316. For example, during the establishment of a PDU session, or during a PCC rule modification process, the PCF 316 may send a QoS Notification Control (QNC) message containing a PCC rule relating to QoS violated event Reporting (QVER) to the SMF 310. If the PCC rule requires QoS violated event Reporting, the SMF 310 may forward a QoS violated event reporting request to the (R)AN 302 and/or UPF 304. If either of the (R)AN 302 or the UPF 304 subsequently detect a QoS-Violated Event, the monitoring function in the (R)AN 302 or in the UPF 304 may send a corresponding QoS violated event report to the SMF 310. The SMF 310 may collect received QoS violated event reports and send them to the PCF 316. The PCF 316 may store received QoS violated event reports in a charging system, such as an Online Charging System (OCS) or an Offline Charging System (OFCS). Alternatively, the PCF 316 may store received QoS violated event reports in another storage function, such as the UDR 340, for example. The online and/or offline charging system may use the QoS violated event reports to adjust the charging policy, such as reducing the charge rate for the services or UEs that have QoS violated events. The Network Data Analytics Function (NWDAF) may subscribe PCF and/or SMF for QoS violated events to analyze the network performance, such as QoS performance, QoS profile(s) for traffic types or service types, which is represented by Application ID.

In some embodiments, one or more of the QoS violated event reports may be sent to an Application Function (AF) 322 associated with the application. Either the SMF 310 or the PCF 316 may send QoS violated event reports to the AF 322, either directly or indirectly via the NEF 314.

The AF 322 may send a subscription request for the QoS violated event reports to the PCF 316 or SMF 310, either directly or via the NEF 314. Such a subscription request may have a conventional format, and may be treated by the receiving function (i.e. either the PCF 316 or SMF 310) in a conventional manner, except that the content of the request is configured to cause the receiving function to send QoS violated event reports to the AF 322. When the PCF 316 receives the subscription request for QoS-Violated Event reports, the PCF 316 may trigger a PCC update process, and consequently send a QNC message containing a PCC rule that includes the QoS violated event Reporting indication to the SMF 310. The SMF 310 may then configure the (R)AN 302 and UPF 304 to monitor and report QoS violated events to the PCF 316 and/or the AF 322. The AF subscription request may include one or more of following information: the QoS parameter(s) to be monitored (such as packet delay, actual bit rate of QoS flow) the QoS violated events to be monitored, the information to identify the QoS flow (such as IP packet filter, Ethernet packet filter, IP or Ethernet address of the UE used for the QoS flow), how often the QoS report is sent to the AF (e.g. immediately after the QoS event happens, or periodically, or other events such as when the PDU session released, or when the UE entered CM-IDLE), the periodicity of QoS reports, address(es) of the AF that receives the QoS report. The address(es) of the AF that receive the QoS report could be the same and/or different with the address of the AF that sends the QoS subscription request. The address of the AF could be an IP packet filter (which may include IP address and/or TCP or UDP port of the AF), or an AF identifier (such as AF-Service-Identifier).

In some embodiments, QoS violated events may include:
a measured bit rate of the PDU session is higher than the Maximum Bit Rate (MBR) parameter defined in a QoS agreement, for example. The bit rate may be measured at any one or more of the UE, a (R)AN node 302, and a UPF 304 traversed by packets associated with the PDU session. For non-GBR QoS flows, the MBR may be a Session Aggregate Maximum Bit Rate (AMBR) or a UE-AMBR, or a MBR of a QoS flow of the PDU session. for GBR flows, the MBR may be a Maximum Flow Bit Rate (MFBR) defined in a QoS agreement, for example;

a measured data burst volume within a predefined (R)AN Packet Delay Budget ((R)AN-PDB) is larger than a predefined Maximum Data Burst Volume of a QoS flow;

a measured packet delay incurred by a PDU of the PDU session at a (R)AN node is larger than the predefined (R)AN-PDB of a QoS flow;

a measured packet delay incurred by a PDU of the PDU session at a UPF is larger than the predefined PDB for the UPF of a QoS flow;

a measured end-to-end packet delay incurred by a PDU of the PDU session measured at a UPF or (R)AN node is larger than the predefined PDB for this QoS flow;

a PDU is dropped in a network function (NF), such as (R)AN and UPF;

a measured packet error rate (PER) of a QoS flow of the PDU session is higher than a predefined maximum PER given in a corresponding QoS profile for the QoS flow at the (R)AN node; or a QoS rule at the UE; or a QoS policy at the UPF;

a QoS flow is released due to a lack of network resources;

The above-noted QoS violated events may happen in either the uplink (UL) or downlink (DL) direction. The QoS flow could be GBR QoS flow, delay critical GBR QoS flow, or non-GBR QoS flow, or other types of QoS flows.

In some embodiments, the SMF may send the QoS violated event reporting request only to the (R)AN 302. When the (R)AN 302 receives a QoS violated event reporting request, for example, the (R)AN 302 may subsequently report QoS violated events to the PCF 316 and/or the AF 322, such as a measured packet delay of a PDU of a QoS flow received at a 5G access node (5G-AN) is larger than the predefined PDB of the 5G-AN for this QoS flow;

a measured data burst volume of a QoS flow within a period of the predefined PDB of the 5G-AN is larger than a predefined Maximum Data Burst Volume for this QoS flow; and a measured flow bitrate of a QoS flow within a predefined Averaging Window for this QoS flow is larger than the MFBR defined for this QoS flow, for example, and some other QoS violated events described earlier.

In some embodiments, the (R)AN 302 may send a QNC notification message containing a QoS violated event Report towards the SMF 310. The QNC notification message may include any one or more of a time stamp of the event; (R)AN ID (e.g. IP Address); UE ID (e.g. SUPI, GPSI); PDU Session ID; QFI; the name of violated QoS parameter, and the measured value of violated QoS parameter. If the packet delay is larger than the 5G-AN PDB, the notification may additionally include the packet size.

The SMF 310 may be configured by the PCF 316 to control how often QoS violated event reports from the (R)AN 302 are forwarded to the PCF 316, for example: immediately; periodically; event-based, such as when the UP of the PDU Session is deactivated, when the UE enters CM-IDLE state, or when the PDU Session is released. The PCF may provide the periodicity of QoS violated event reports in a PCC rule to the SMF.

A technical benefit of the above-described embodiment is that it enables the SMF to configure the (R)AN 302, in an embodiment as illustrated at Step 2b, to report QoS violated events for delay critical QoS flows.

The above description focuses on configuring the (R)AN 302 to implement QoS-Violated Event reporting functionality. As may be appreciated, a similar approach may be used to implement QoS violated event reporting functionality in the UPF 304. For example, in the embodiment illustrated in FIG. 4, at Step 1, the PCF 316 may send a QoS Notification Control (QNC) message containing an applicable QoS violated event Reporting (QVER) PCC rule to the SMF 310. In some embodiments, the QVER PCC rule may have a format closely similar to that used for conventional PCC Rules, except that it may include a "QoS violated event report" parameter, which indicates whether QoS violated events should be reported when one or more QoS parameters are violated.

If the QVER PCC rule requires QoS violated event Reporting, the SMF 310, at Step 2a, may forward a QoS violated event reporting request to the UPF 304.

The Policy and Charging Enforcement Function (PCEF) in the UPF can be configured in accordance with the QVER PCC rule to report QoS violated events. For delay critical GBR Flows, if configured, the PCEF may send, at Step 4a, a QoS violated event notification to the SMF 310 for any detected QoS violated events detected at UPF 3a and (R)AN 3b, in accordance with Steps 4a, 4b respectively, including the following events, for example:

A measured packet delay of a PDU of a QoS flow received at the UPF is longer than the predefined PDB of the UPF for this QoS flow.
The measured flow bitrate of a particular QoS flow is larger than a predefined maximum flow bit rate (MFBR) for this QoS flow.
The measured data burst volume of a particular QoS flow within a period of the PDB of the UPF is larger than a predefined Maximum Data Burst Volume for this QoS flow;
And some other QoS violated events described above.

The QoS violated event report contained in a QNC notification message sent towards the SMF 310 by the UPF may include any one or more of: a time stamp of the event; a UPF ID (e.g. IP Address); UE ID (e.g. SUPI, GPSI); PDU Session ID; QFI; the name of violated QoS parameter; and the measured value of violated QoS parameter. If the packet delay is larger than the UPF PDB, the QoS violated event notification may additionally include the packet size.

In some embodiments, a PCC rule may include a "QoS Notification Control (QNC)" parameter, which indicates whether notifications are requested from a 3GPP (R)AN when the GFBR can no longer (or again) be fulfilled for a QoS Flow during the lifetime of the QoS Flow. In some embodiments, the conventional (R)AN notification message format may be extended to include one or more fields for QoS violated event reports pertaining to delay critical QoS flows. Such embodiments may also cover additional solutions such as:

QoS violated event reporting for any QoS flows, rather than just delay critical GBR flows.
The QNC parameter in PCC rule can be used to instruct the SMF to request the UPF and/or the UE to report the QoS violated events. This arrangement may obviate the need for an additional "QoS violated event report" parameter in PCC rules for configuring CN functions (such as UPF and SMF) to implement the QoS violated event report functionality.

In the foregoing description, QoS violated event reports can be sent from (R)AN 302 to SMF 310 at Step 4b, from UPF 304 to SMF 310 at Step 4a, from SMF 310 to PCF 316 at Step 5, from SMF 310 to AF 322, from PCF 316 to AF 322. The communications between SMF 310 (or PCF 316) and AF 322 could be transfer by the NEF 314. In some embodiments, QoS violated event report traffic may be transmitted according to any one or more of the following methods:

Immediately: the QoS violated event report is sent by the detecting function (i.e. either the (R)AN or the UPF) immediately after the event is detected 3a, 3b, or is sent by a receiving function (e.g. the SMF at Step 5 or PCF) immediately after it is received.
Periodically: the QoS violated event reports are stored locally in the detecting function (such as (R)AN 302 or UPF 304). Stored QoS violated event reports are sent to a receiving function (e.g. the SMF or PCF) at predetermined intervals. The predetermined interval may be included in the QoS monitoring and QoS violated event reporting policy sent from PCF to the SMF, and from the SMF to the UPF, and/or (R)AN, and/or UE. In some embodiments, two or more stored QoS violated event reports may be encapsulated within a single QNC notification message, so as to reduce signaling overhead associated with sending multiple stored QoS violated event reports.
Event-based report: QoS violated event reports are stored locally in the detecting function (such as (R)AN 302 or UPF 304). Stored QoS violated event reports are sent to the receiving function (e.g. the SMF or PCF) when a predetermined event occurs. Example events that may trigger transmission of stored QoS violated event reports include: the UP of the PDU session is deactivated; the PDU session is released; the UE associated with the PDU session enters CM-IDLE state; and the UE transitions from the RRC-CONNECTED state to the RRC-INACTIVE state.

In the 5G system, each network segment has a delay budget. This means that each network segment is designed to meet its own PDB. However, the UP path may consist of multiple UPFs. The current 5G standards do not provide any means by which a UPF can ensure that the PDB of the CN (as a whole) is satisfied. More particularly, the current 5G standards do not provide any means by which QoS violated events can be detected, where the particular event is that the total transmission delay experienced by a packet exceeds the PDB of the CN.

Figure 5:
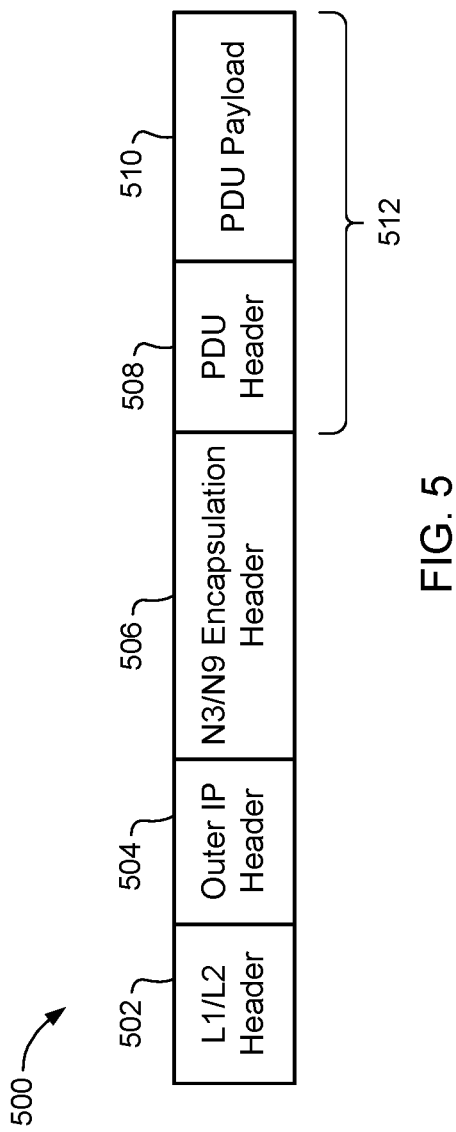
FIG. 5 is a block diagram schematically illustrating a representative format of packets sent in N3 and N9 interfaces, which may be used in embodiments of the present invention.

In some embodiments of the present invention, this problem is addressed by adding a timestamp field in the N3/N9 encapsulation header as shown in FIGS. 4 and 5.

FIG. 5 is a block diagram illustrating a method 500 used to transport User-Plane traffic through a tunnel in the core network. In some embodiments, the tunnel may be a GTP-U tunnel such as tunnel 328 or tunnel 330 described above with reference to FIG. 3. In general terms, the Protocol Data Unit (PDU) 512 may include a Payload header 508 and a PDU Payload 510. Transport network layers add other header information, for example an L1/L2 header 502, an outer IP header 504, an N3/N9 Encapsulation Header (also referred to as an L4 tunnel encapsulation header) 506.

The L1/L2 header 502 is used to route traffic on specific media, such as optical cable or wireless link. Those skilled in the art will appreciate that from the perspective of an L1/L2 entity, the Outer IP header 504, N3/N9 encapsulation header 506 and the payload 512 may all appear to be a payload.

The Outer IP header 504 typically contains IP addresses and UDP port numbers of the packet source and destination, which will normally be the UPF 304 and the (R)AN node 302. From the perspective of an L3 entity, the N3/N9 encapsulation header 506 and the payload 512 may all appear to be a part of payload.

The N3/N9 encapsulation header 506 will typically include tunnel specific information such as a Tunnel Endpoint Identifier (TEID) identifying the tunnel 328A, 328B . . . 328N (or tunnel 330), as well as Quality of Service (QoS) Flow Identifier (QFI) and RQI information of packet flows within the tunnel 328 (or tunnel 330). Where a non-GTP-U tunnel is employed, other tunnel identifying information may be employed in place of the GTP-U TEID.

The Payload header 508 and Payload 510 comprise the application-layer Protocol Data Unit (PDU) 512 that is sent and received by an application executing on the ED 102. Typically, the QoS requirement of the application-layer PDU 512 is determined by the application executed in the ED 102, and will normally be indicated by one or more QoS parameters inserted in the Payload header 508.

Figure 7:
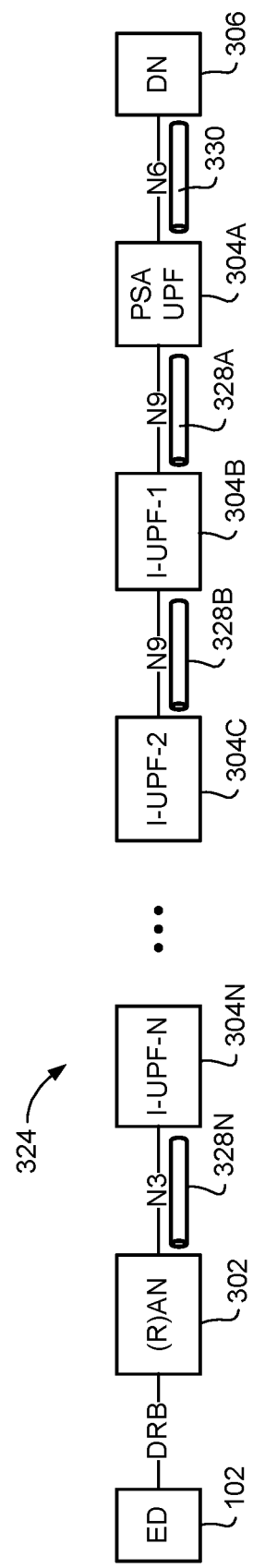
FIG. 7 is a block diagram schematically illustrating an example network User Plane, which may be used in embodiments of the present invention.

In some embodiments, the timestamp field may be provided as a new field added to the GTP-U protocol (not shown in FIG. 5). Alternatively, the timestamp field may be placed in an Extension Header of the GTP-U protocol. FIG. 6 illustrates an example embodiment in which the conventional sub-fields 602 of the N3/N9 encapsulation header 506 are supplemented by a timestamp field 604 which may contain one or more timestamps 606. FIG. 7 illustrates an example network User Plane 700 comprising a plurality of UPFs implemented in series between the RAN 302 and the DN 306.

When a DownLink (DL) packet destined for a particular UE is received in a PDU Session Anchor (PSA) UPF 304A, e.g. in a buffer of an ingress port, the PSA UPF encapsulates the packet for transport through the core network and inserts a first timestamp, namely Timestamp-1, which indicates the time that the packet was received by the PSA UPF.

When the packet is sent out from the PSA UPF, a specific function (e.g. packet delay monitoring function) of PCEF checks Timestamp-1 of the PDU header. If the duration the packet stayed in the PSA UPF is longer than the packet delay budget of the PSA UPF, or if the packet delay between the time the PDU is sent out of the UPF and Timestamp-1 is larger than the PDB, the PCEF of the PSA UPF reports the QoS violated event to the SMF.

The PSA UPF may forward the packet to an Intermediate UPF (I-UPF-1) 304B over a tunnel, such as N9 tunnel. A specific function (e.g. packet delay monitoring function) of PCEF may add another timestamp, namely Timestamp-2. The PCEF of I-UPF-1 may then check the duration between Timestamp-1 and Timestamp-2. If this duration is larger than the CN PDB, the PCEF of I-UPF-1 reports this QoS violated event to the SMF.

Similarly, when the packet is sent out of I-UPF-1, a specific function of PCEF of I-UPF-1 checks the duration that the PDU stayed in I-UPF-1. If this duration is larger than the PDB for this UPF, the UPF may report this QoS violated event to the SMF. If the total duration between the time the PDU is sent out of I-UPF-1 and Timestamp-1 is larger than the PDB of CN, the I-UPF may report this QoS violated event to the SMF.

The I-UPF-1 may forward the PDU to another Intermediate UPF (I-UPF-2) 304C. The I-UPF-2 may monitor the packet delay using similar procedures as in I-UPF-1.

When the last UPF, UPF-N 304N, of the CN sends the PDU to a (R)AN node 302 over the N3 interface, the (R)AN node 302 may monitor the packet delay in a similar way as the UPFs monitor packet delay described above. Specifically, the (R)AN node 302 may check Timestamp-1 when receiving the N3 PDU. If the total delayed time (between Times tamp-1 and the current time at the (R)AN node 302) is larger than the predefined end-to-end PDB, the (R)AN node 302 may report this QoS violated event to the SMF. Similarly, the (R)AN node may check the total duration the packet stayed in the (R)AN node. If this duration is larger than the AN-PDB, the (R)AN node may report this QoS violated event to the SMF.

The (R)AN may use the measured PDU delay between the Timestamp-1 and the current time at the (R)AN node to calculate the average packet delay in the CN in the downlink, in which several measured packet delays of several PDUs are used to calculate the average packet delay in the CN. The (R)AN may report the packet delay of each packet or average packet delay of QoS flows in the DL to the SMF sent in an N2 SM message.

The (R)AN node may also check the end-to-end delay, between the time the packet is successfully sent out of (R)AN or the time the (R)AN received an acknowledgment from the UE for the packet, and the Timestamp-1. If the total end-to-end delay is larger than the (end-to-end) PDB, the (R)AN may report this QoS violated event to the SMF.

The (R)AN may use the measured total end-to-end packet delay to calculate average end-to-end packet delay in the downlink, in which several measured end-to-end packet delays of several PDUs are used to calculate the average packet delay in the CN. The (R)AN may report the total end-to-end packet delay of each packet or average end-to-end packet delay of QoS flows in the DL to the SMF sent in an N2 SM message.

Since the (R)AN may use the Timestamp-1 to calculate the packet delay in the CN, the (R)AN may calculate the DL (R)AN PDB in the (R)AN, for example by taking the total DL PDB minus the measured DL packet delay or average packet delay in the CN. The total PDB is an upper bound for the time that a packet may be delayed between the UE and the PSA UPF that terminates the N6 interface. The N6 interface is the interface between the mobile network and the data network. For delay critical QoS flow, if the measured packet delay in the CN, and/or the total packet delay between the PSA UPF and the UE is larger than the total PDB, the (R)AN may consider this packet is erroneous and this erroneous packet is counted in the PER calculation. The (R)AN may use the calculated DL (R)AN PDB for DL packet scheduling.

In the above description, each UPF may add a timestamp to the N3/N9 encapsulation header when the UPF receives the PDU. The SMF may use the QoS violated event report to track which network segment may cause longer packet delay.

In the above description, the timestamp(s) is/are added to DL PDUs by the first PSA UPF, and I-UPF(s), and (R)AN. Similarly, in the UL, the (R)AN, I-UPF(s) and PSA UPF may add timestamp to the UL PDUs.

In another embodiment, only the PSA UPF adds the timestamp when it receives the DL PDU. The UPF (either I-UPF or PSA UPF) that is connected to the (R)AN by N3 tunnel will check the PDU delay in the CN, before sending the PDU to the (R)AN. If the PDU delay in CN is larger than the CN PDB, this QoS violated event may reported to the SMF. Similarly, in the UL, the UPF (either I-UPF or PSA UPF) that is connected to the (R)AN adds the timestamp to the UL PDU when it receives the UL PDU. The PSA UPF will check the packet delay before sending the PDU to DN. If the delay of UL PDU in the CN is larger than the CN PDB, the PSA UPF reports this QoS violated event to the SMF.

In another embodiment, only the (R)AN adds timestamp to the UL PDU. The PSA UPF will check the end-to-end PDU delay. If the PDU delay is larger than the PDB, the PSA UPF will report this QoS violated event to the SMF.

The (R)AN may add timestamps to the UL PDU that indicate the current time in the (R)AN node and/or the timestamp created by the UE. The PSA UPF timestamp(s) provided by the (R)AN node to calculate the UL packet delay in the CN and/or the end-to-end packet delay between the UE and the PSA UPF in the UL. The PSA UPF may use the measured packet delay in the CN or between the UE and the PSA UPF to calculate the average packet delay in the CN and/or the end-to-end packet delay between the UE and the PSA UPF. The PSA UPF may report the average packet delay in the CN or the average end-to-end packet delay between the UE and the PSA UPF in the UL of the QoS flows to the SMF by a message sent over N4 logical interface. FIG. 8 illustrates another method to add timestamps to the N3/N9 encapsulation header. In the embodiment of FIG. 6, each UPF adds a Timestamp-IN when it receives the PDU, and then adds a Timestamp-OUT when it sends out the PDU.

Each next UPF or (R)AN node may check the accumulated timestamps to detect QoS violated events, and the SMF can clearly identify which network function(s) and transportation segment(s) cause longer packet delay.

The above description is for the DL PDU, in which the PDU is first sent from DN to the PSA UPF. In the UpLink (UL), timestamps can be added to the N3 or N9 encapsulation header and used to detect QoS violated events in a similar manner.

The Timestamp can be carried by adding a new field to the current GTP-U protocol defined in 3GPP TS 29.281, published in Dec. 21, 2017. Alternatively, the timestamp can be carried by using an Extension Header field of GTP-U protocol, where the Next Extension Header Type indicates a new type to carry timestamp, e.g., timestamp type, the Extension Header field carries the timestamp. In another embodiment, the timestamp can be carried in one of Extension Header fields of other Next Extension Header Types.

The packet delay events to be reported by UP functions (UPF and (R)AN) to SMF may include:

Event 1: For the event that the duration the PDU stays in a particular network function is longer than the PDB for that network function.

Event 2: For the event that the duration between the time the UL PDU arrives in a particular network function, such as a (R)AN node, and the time the packet arrives at or is sent out from the PSA UPF is longer than the PDB.

Event 3: For the event that the duration between the time the DL PDU arrives or is sent out of a network function, such as a (R)AN node, and the time the packet arrives the PSA UPF is longer than the PDB.

The QoS violated event report may include any one or more of the following information items:

Event ID,
Network Function ID (e.g. (R)AN ID, UPF ID or IP address or FQDN) that reports the QoS violated event,
UE ID (e.g. GPSI, SUPI, TMSI),
An identifier to identify Application,
packet filter if relevant (in PSA UPF),
PDU Session ID
PDB of PSA UPF and/or (end-to-end) PDB
All the Timestamps of network functions
The packet delay in PSA UPF
The size of PDU
A copy of PDU The packet delay event report may be configured in the PCC rule by a separate PCC rule parameter, e.g. "Packet Delay Report". This parameter can be further indicated in the PCC rule to be applied to (R)AN node, and/or UPF, and/or UE. The SMF obtains PCC rules from the PCF when the PDU Session is established or modified.

Based on the packet delay event report in the PCC rule, the SMF may send to the (R)AN node and UPF, and/or UE a request to add a Timestamp to the PDU, when the PDU arrives at the NF and/or UE, the PDU leaves the NF and/or UE, or when PDU arrives and leaves the NF that serves PDU Session.

The UPF may send the Packet Delay Report to the SMF according to the reporting rule received from the SMF by using N4 Report procedure. The UPF may report the measured packet delay of individual PDUs of QoS flows, the average packet delay of QoS flows in the UL and/or DL, for the CN segment between the PSA and (R)AN or for the end-to-end packet delay between the UE and the PSA UPF.

The (R)AN may send the Packet Delay Report to the SMF in N2 SM messages, according to the reporting rule received from the SMF. The (R)AN may report the measured packet delay of individual PDUs of QoS flows, the average packet delay of QoS flows in the UL and/or DL, for the CN segment, or for the air interface (may be also called Uu interface).

The UE may send the Packet Delay Report to the SMF according to the rule received from the SMF by using N1 SM message sent over the N1 logical interface. The UE may report the measured packet delay of individual PDUs of QoS flows, the average packet delay of QoS flows in the UL and/or DL for the end-to-end packet delay between the UE and the PSA UPF.

Alternatively, by default, the timestamp may be added to the N3/N9 tunnel header when the QoS violated event report is requested in the PCC rule.

Implementation in TS 23.501

The following paragraphs describe an implementation of embodiments of the invention in the context of 3GPP Technical Specification TS 23.501. Such an implementation may incorporate some or all of the elements described above, in any suitable combination.

Clause 5.7.2.4: Notification Control

A GBR QoS Flow may be associated with the parameter: Notification control.

The Notification control indicates whether notifications are requested from the (R)AN and/or UPF when the QoS targets can no longer (or again) be fulfilled for a QoS Flow during the lifetime of the QoS Flow.

If, for a given GBR or delay critical GBR QoS Flow, notification control is enabled and the NG-RAN determines that the GFBR cannot be fulfilled, (R)AN may send a notification towards SMF. The (R)AN may keep the QoS Flow, and should try to fulfill the GFBR. Upon receiving a notification from the (R)AN that the GFBR cannot be fulfilled, the 5GC may initiate N2 signaling to modify or remove the QoS Flow. When applicable, NG-RAN sends a new notification, informing SMF that the GFBR can be fulfilled again. After a configured time, the NG-RAN may send a subsequent notification that the GFBR cannot be fulfilled.

If, for any QoS Flows, including delay critical GBR QoS Flow, notification control is enabled and the (R)AN node, such as a NG-RAN node, determines that the QoS parameters given in the QoS profiles or pre-configured in the (R)AN node are violated, the packet delay of a PDU is larger than the 5G-AN PDB;
the measured data burst volume within a period of 5G-AN PDB is larger than the Maximum Data Burst Volume;
the measured flow bitrate within the Averaging Window is larger than the MFBR;
the measured Session-AMBR is larger than the authorized Session-AMBR;
the measured UE-AMBR is larger than the subscribed UE-AMBR;
a PDU is dropped in a (R)AN node;
a measured packet error rate (PER) of a QoS flow of PDU session is higher than the maximum PER given in the corresponding the QoS profile for this QoS flow at the (R)AN node; and
a QoS flow is released due to the lack of network resources.

The (R)AN may send a notification towards the SMF. The notification for delay critical GBR QoS Flows includes time stamp of the event, PDU Session ID, QFI, the name of violated QoS parameter, and the measured value of violated QoS parameter. If the packet delay is larger than the 5G-AN PDB, the notification additionally includes the packet size.

The SMF can be configured by the PCF how often the notification from (R)AN is forwarded to the PCF: immediately, periodically, or event-based, when the UP of PDU Session is deactivated, when the UE enters CM-IDLE state, or when the PDU Session is released. The periodicity of event reporting may be included in the QoS monitoring and QoS violated event reporting policy sent from PCF to the SMF.

QoS Violated Event Report

For any QoS Flows, including GBR and delay critical GBR QoS Flow, the parameter QoS violated event Report is used to indicate whether the UPF may report QoS violated events,
the packet delay of the PDU is larger than the UPF PDB;
the measured data burst volume within a period of UPF PDB is larger than the Maximum Data Burst Volume; and
the measured flow bitrate within the Averaging Window is larger than the MFBR,
the UPF cannot support the GFBR,
the measured Session-AMBR is larger than the authorized Session-AMBR,
the measured UE-AMBR is larger than the subscribed UE-AMBR.
a PDU is dropped in a UPF; and
a measured packet error rate (PER) of a QoS flow of a PDU session is higher than the maximum PER given in the corresponding PCC rule for this QoS flow at the UPF.

The UPF may send QoS violated event reports to the SMF. The SMF can be configured by the PCF how often the notification from UPF is forwarded to the PCF: immediately, periodically, or event-based, when the UP of PDU Session is deactivated, or when the PDU Session is released.

Implementation in TS 23.502

The following paragraphs describe an implementation of embodiments of the invention in the context of 3GPP Technical Specification TS 23.502. Such an implementation may incorporate some or all of the elements described above, in any suitable combination.

Clause 4.3.2.2.1: Non-Roaming and Roaming with Local Breakout

Clause 4.3.2.2.1 specifies PDU Session establishment in the non-roaming and roaming with local breakout cases. The procedure is used to:

Establish a new PDU Session;
Handover a PDN Connection in EPS to PDU Session in 5GS without N26 interface;
Switching an existing PDU Session between non-3GPP access and 3GPP access. The specific system behaviour in this case is further defined in clause 4.9.2 of TS 23.502; or
request a PDU Session for Emergency services.

In case of roaming, the AMF determines if a PDU Session is to be established in LBO or Home Routing. In the case of LBO, the procedure is as in the case of non-roaming with the difference that the AMF, the SMF, the UPF and the PCF are located in the visited network. PDU Sessions for Emergency services are never established in Home Routed mode.

Figure 9A:
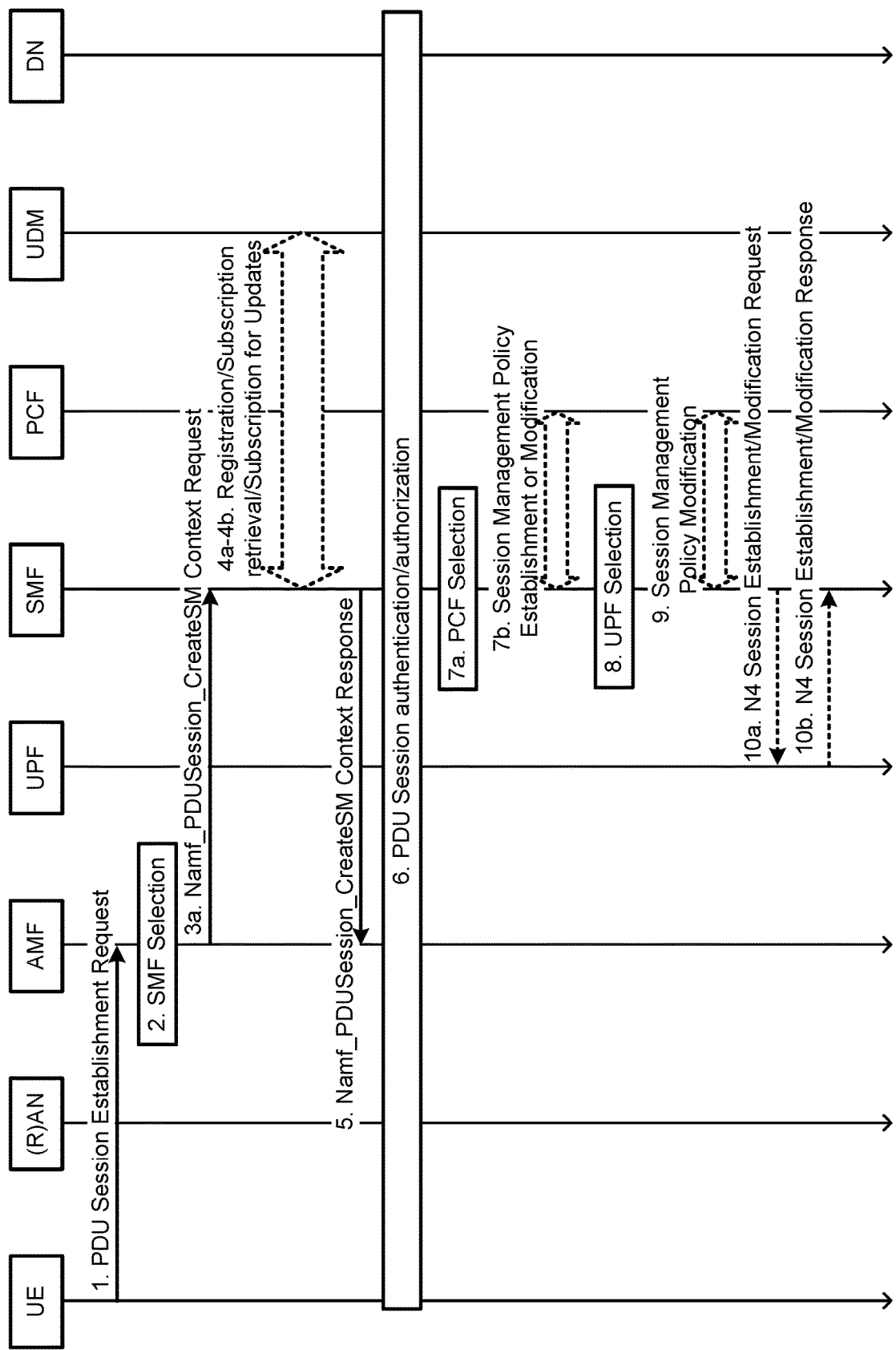
FIGS. 9A-9B show a message flow diagram illustrating a representative process for UE-requested PDU Session Establishment for non-roaming and roaming with local breakout, which may be used in embodiments of the present invention.
Figure 9B:
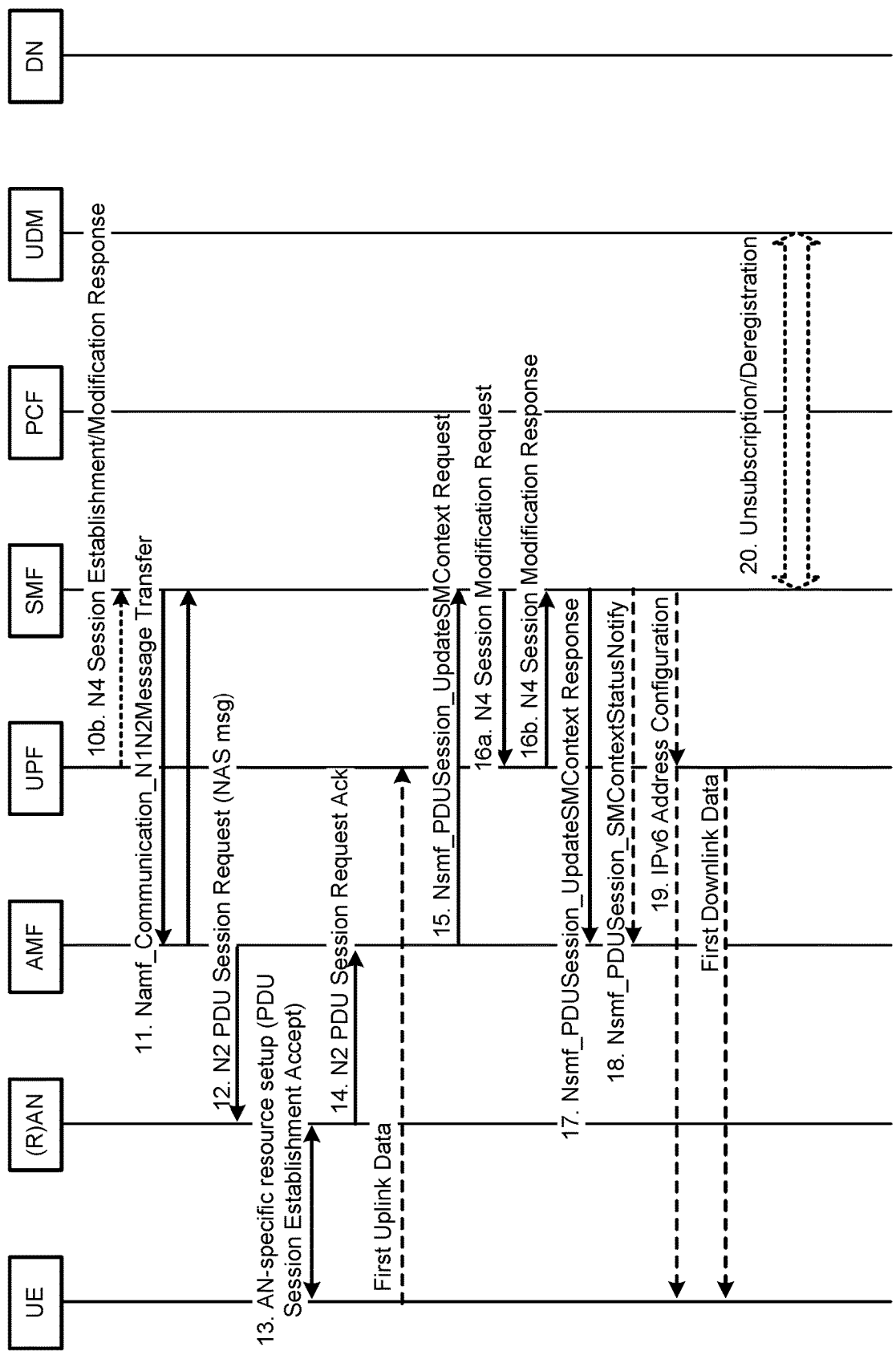

UE-Requested PDU Session Establishment for Non-Roaming and Roaming with Local Breakout FIGS. 9A-9B illustrate a representative process for UE-requested PDU Session Establishment for non-roaming and roaming with local breakout. This procedure assumes that the UE has already registered on the AMF thus unless the UE is Emergency registered the AMF has already retrieved the user subscription data from the UDM.

Step 1: From UE to AMF: NAS Message (S-NSSAI(s), DNN, PDU Session ID, Request type, Old PDU Session ID, N1 SM container (PDU Session Establishment Request)).
In order to establish a new PDU Session, the UE generates a new PDU Session ID.
The UE initiates the UE Requested PDU Session Establishment procedure by the transmission of a NAS message containing a PDU Session Establishment Request within the N1 SM container. The PDU Session Establishment Request may include a Requested PDU Type, a Requested SSC mode, Protocol Configuration Options, SM PDU DN Request Container.
The Request Type indicates "Initial request" if the PDU Session Establishment is a request to establish a new PDU Session and indicates "Existing PDU Session" if the request refers to an existing PDU Session switching between 3GPP access and non-3GPP access or to a PDU Session handover from an existing PDN connection in EPC. If the request refers to an existing PDN connection in EPC, the S-NSSAI is set based on the S-NSSAI received from PCO which is sent by PGW-C+SMF during PDN Connection Establishment procedure. When Emergency service is required and an Emergency PDU Session is not already established, a UE may initiate the UE Requested PDU Session Establishment procedure with a Request Type indicating "Emergency Request".
The Request Type indicates "Emergency Request" if the PDU Session Establishment is a request to establish a PDU Session for Emergency services. The Request Type indicates "Existing Emergency PDU Session" if the request refers to an existing PDU Session for Emergency services switching between 3GPP access and non-3GPP access.
The NAS message sent by the UE is encapsulated by the AN in a N2 message towards the AMF that should include User location information and Access Technology Type Information.
The PDU Session Establishment Request message may contain SM PDU DN Request Container containing information for the PDU Session authorization by the external DN.
The UE includes the S-NSSAI from the Allowed NSSAI. If the Mapping of Allowed NSSAI was provided to the UE, the UE may provide both the S-NSSAI from the Allowed NSSAI and the corresponding S-NSSAI from the Configured NSSAI for the HPLMN.

If the procedure is triggered for SSC mode 3 operation, the UE may also include the Old PDU Session ID which indicates the PDU Session ID of the on-going PDU Session to be released, in NAS message. The Old PDU Session ID is an optional parameter which is included only in this case.

The AMF receives from the AN the NAS SM message (built in step 1) together with User Location Information (e.g. Cell Id in case of the (R)AN).

The UE may not trigger a PDU Session establishment for a PDU Session corresponding to a LADN when the UE is outside the area of availability of the LADN.

Step 2: The AMF determines that the message corresponds to a request for a new PDU Session based on that Request Type indicates "initial request" and that the PDU Session ID is not used for any existing PDU Session(s) of the UE. If the NAS message does not contain an S-NSSAI, the AMF may determine a default S-NSSAI for the requested PDU Session either according to the UE subscription, if it contains only one default S-NSSAI, or based on operator policy.

The AMF selects an SMF as described in clause 4.3.2.2.3 of TS 23.502. If the Request Type indicates "Initial request" or the request is due to handover from EPS, the AMF stores an association of the S-NSSAI(s), the DNN, the PDU Session ID and the SMF ID.

If the Request Type is "initial request" and if the Old PDU Session ID indicating the existing PDU Session is also contained in the message, the AMF selects an SMF as described in clause 4.3.5.2 of TS 23.502 and stores an association of the new PDU Session ID, the S-NSSAI and the selected SMF ID.

If the Request Type indicates "Existing PDU Session", the AMF selects the SMF based on SMF-ID received from UDM. The case where the Request Type indicates "Existing PDU Session", and either the AMF does not recognize the PDU Session ID or the subscription context that the AMF received from UDM during the Registration or Subscription Profile Update Notification procedure does not contain an SMF ID corresponding to the PDU Session ID constitutes an error case.

If the Request Type indicates "Existing PDU Session" referring to an existing PDU Session moved between 3GPP access and non-3GPP access, then if the SMF ID (H-SMF in home-routed case) corresponding to the PDU Session ID and the AMF belong to the same PLMN, the PDU Session Establishment procedure can be performed, otherwise the AMF may reject the PDU Session Establishment Request with an appropriate reject cause.

NOTE 1: The SMF ID includes the PLMN ID that the SMF belongs to.

The AMF may reject a request coming from an UE when the UE is registered for Emergency services and the Request Type indicates neither "Emergency Request" nor "Existing Emergency PDU Session". When the Request Type indicates "Emergency Request", the AMF is not expecting any S-NSSAI and DNN value provided by the UE and uses locally configured values instead.

If the Request Type indicates "Emergency Request" or "Existing Emergency PDU Session", the AMF selects the SMF as described in TS 23.501 [2], clause 5.16.4.

Step 3: From AMF to SMF: Either Nsmf_PDUSession_CreateSMContext Request (SUPI, DNN, S-NSSAI, PDU Session ID, AMF ID, Request Type, N1 SM container (PDU Session Establishment Request), User location information, Access Type, PEI, GPSI, Subscription For PDU Session Status Notification) or Nsmf_PDUSession_UpdateSMContext Request (SUPI, DNN, S-NSSAI, PDU Session ID, AMF ID, Request Type, N1 SM container (PDU Session Establishment Request), User location information, Access Type, RAT type, PEI).

If the AMF does not have an association with an SMF for the PDU Session ID provided by the UE (e.g. when Request Type indicates "initial request"), the AMF invokes the Nsmf_PDUSession_CreateSMContext Request, but if the AMF already has an association with an SMF for the PDU Session ID provided by the UE (e.g. when Request Type indicates "existing PDU Session"), the AMF invokes the Nsmf_PDUSession_UpdateSMContext Request.

The AMF ID is the UE's GUAMI which uniquely identifies the AMF serving the UE. The AMF forwards the PDU Session ID together with the N1 SM container containing the PDU Session Establishment Request received from the UE. The GPSI may be included if available at AMF.

The AMF provides the PEI instead of the SUPI when the UE has registered for Emergency services without providing a SUPI. The PEI is defined in TS 23.501 [2] clause 5.9.3. In case the UE has registered for Emergency services with a SUPI but has not been authenticated the AMF indicates that the SUPI has not been authenticated. The SMF determines that the UE has not been authenticated when it does not receive a SUPI for the UE or when the AMF indicates that the SUPI has not been authenticated.

If the Old PDU Session ID is included in step 1, and if the SMF is not to be reallocated, the AMF also includes Old PDU Session ID in the Nsmf_PDUSession_CreateSMContext Request.

In the local breakout case, if the V-SMF is not able to process some part of the N1 SM information then Home Routed Roaming is required, and the V-SMF responds to the AMF that it is not the right SMF to handle the N1 SM message by invoking Nsmf_PDUSession_CreateSM Response service operation. The V-SMF includes a proper N11 cause code triggering the AMF to proceed with home routed case. The procedure starts again at step 2 of clause 4.3.2.2.2 of TS 23.502.

Step 4: If Request Type in step 3 indicates neither "Emergency Request" nor "Existing Emergency PDU Session" and, if the SMF has not yet registered for this PDU Session ID, then the SMF registers with the UDM using Nudm_UECM_Registration (SUPI, DNN, PDU Session ID) for a given PDU Session. As a result, the UDM stores following information: SUPI, SMF identity, SMF address and the associated DNN and PDU Session ID. If Session Management Subscription data for corresponding SUPI, DNN and S-NSSAI is not available, then SMF retrieves the Session Management Subscription data using Nudm_SDM_Get (SUPI, DNN, S-NSSAI) and subscribes to be notified when this subscription data is modified using Nudm_SDM_Subscribe (SUPI, DNN, S-NSSAI).

If the Request Type received in step 3 indicates "Emergency Request"

For an authenticated non-roaming UE, based on operator configuration (e.g. related with whether the operator uses a fixed SMF for Emergency calls, etc.), the SMF may register in the UDM using Nudm_UECM_Registration (SUPI, PDU Session ID, Indication of Emergency Services) for a given PDU Session that is applicable for emergency services. As a result, the UDM may store the SMF address and the applicable PDU Session for Emergency services.

For an unauthenticated UE or a roaming UE, the SMF may not register in the UDM for a given PDU Session.

If the Request Type in step 3 indicates "Existing PDU Session" or "Existing Emergency PDU Session" the SMF determines that the request is due to switching between 3GPP access and non-3GPP access or due to handover from EPS. The SMF identifies the existing PDU Session based on the PDU Session ID. In such a case, the SMF does not create a new SM context but instead updates the existing SM context and provides the representation of the updated SM context to the AMF in the response.

If the Request Type is "Initial request" and if the Old PDU Session ID is included in Nsmf_PDUSession_CreateSMContext Request, the SMF identifies the existing PDU Session to be released based on the Old PDU Session ID.

Subscription data includes the authorized PDU type(s), authorized SSC mode(s), default 5QI and ARP, subscribed Session-AMBR.

Static IP address/prefix may be included in the subscription data if the UE has subscribed to it.

The SMF checks the validity of the UE request: it checks whether the UE request is compliant with the user subscription and with local policies;

(If the DNN corresponds to an LADN), whether the UE is located within the LADN service area based on the UE location reporting from the AMF.

If the UE request is considered as not valid, the SMF decides to not accept to establish the PDU Session.

Step 5: From SMF to AMF: Either Nsmf_PDUSession_CreateSMContext Response(Cause, SM Context ID or N1 SM container (PDU Session Reject(Cause))) or an Nsmf_PDUSession_UpdateSMContext Response depending on the request received in step 3.

If the SMF received Nsmf_PDUSession_CreateSMContext Request in step 3 and the SMF is able to process the PDU Session establishment request, the SMF creates an SM context and responds to the AMF by providing an SM Context Identifier.

When the SMF decides to not accept to establish a PDU Session, the SMF rejects the UE request via NAS SM signaling including a relevant SM rejection cause by responding to the AMF with Nsmf_PDUSession_CreateSMContext Response. The SMF also indicates to the AMF that the PDU Session ID is to be considered as released, deregisters from UDM for this PDU Session and the rest of the procedure is skipped.

Step 6: Optional Secondary authorization/authentication.

If the Request Type in step 3 indicates "Existing PDU Session", the SMF does not perform secondary authorization/authentication.

If the Request Type received in step 3 indicates "Emergency Request" or "Existing Emergency PDU Session", the SMF may not perform secondary authorization/authentication.

If the SMF needs to perform secondary authorization/authentication during the establishment of the PDU Session by a DN-AAA server as described in TS 23.501 [2] clause 5.6.6, the SMF triggers the PDU Session establishment authentication/authorization as described in clause 4.3.2.3 of TS 23.502.

If the PDU Session establishment authentication/authorization fails, the SMF proceeds to step 19 and the PDU Session Establishment procedure is stopped.

Step 7a: If dynamic PCC is deployed, the SMF performs PCF selection. If the Request Type indicates "Existing PDU Session" or "Existing Emergency PDU Session", the SMF may use the PCF already selected for the PDU Session.

If dynamic PCC is not deployed, the SMF may apply local policy.

Step 7b: The SMF may perform a Session Management Policy Establishment procedure as defined in clause 4.16.4 to establish a PDU Session with the PCF and get the default PCC Rules for the PDU Session. The GPSI may be included if available at SMF. If the Request Type in step 3 indicates "Existing PDU Session", the SMF may notify an event previously subscribed by the PCF by a Session Management Policy Modification procedure as defined in clause 4.16.5 and the PCF may update policy information in the SMF. The PCF may provide authorized Session-AMBR and the authorized 5QI and ARP to SMF. The PCF subscribes to the IP allocation/release event in the SMF (and may subscribe other events).

The PCF, based on the Emergency DNN, sets the ARP of the PCC rules to a value that is reserved for Emergency services as described in TS 23.503 [20].

NOTE 2: The purpose of step 7 is to receive PCC rules before selecting UPF. If PCC rules are not needed as input for UPF selection, step 7 can be performed after step 8.

As explained earlier and later in the present document, the PCC Rules include the QoS Violated Event Reporting Rule.

Step 8: If the Request Type in step 3 indicates "Initial request", the SMF selects an SSC mode for the PDU Session as described in TS 23.501 [2] clause 5.6.9.3. The SMF also selects one or more UPFs as needed as described in TS 23.501 [2] clause 6.3.3. In case of PDU Type IPv4 or IPv6, the SMF allocates an IP address/prefix for the PDU Session as described in TS 23.501 [2] clause 5.8.1. In case of PDU Type IPv6, the SMF also allocates an interface identifier to the UE for the UE to build its link-local address. For Unstructured PDU Type the SMF may allocate an IPv6 prefix for the PDU Session and N6 point-to-point tunneling (based on UDP/IPv6) as described in TS 23.501 [2] clause 5.6.10.3. For Ethernet PDU type PDU Session, neither a MAC nor an IP address is allocated by the SMF to the UE for this PDU Session.

If the Request Type in Step 3 is "Existing PDU Session", the SMF maintains the same IP address/prefix that has already been allocated to the UE in the source network.

If the Request Type in step 3 indicates "Existing PDU Session" referring to an existing PDU Session moved between 3GPP access and non-3GPP access the SMF maintains the SSC mode of the PDU Session, the current PDU Session Anchor and IP address.

NOTE 3: The SMF may decide to trigger e.g. new intermediate UPF insertion or allocation of a new UPF as described in step 5 in clause 4.2.3.2 of TS 23.502.

If the Request Type indicates "Emergency Request", the SMF selects the UPF as described in TS 23.501 [2], clause 5.16.4 and selects SSC mode 1.

Step 9: SMF may perform a Session Management Policy Modification procedure as defined in clause 4.16.5 to report some event to the PCF that has previously subscribed. If Request Type is "initial request" and dynamic PCC is deployed and PDU Type is IPv4 or IPv6, SMF notifies the PCF (that has previously subscribed) with the allocated UE IP address/prefix.

NOTE 4: If an IP address/prefix has been allocated before step 7 (e.g. subscribed static IP address/prefix in UDM) or the step 7 is perform after step 8, the IP address/prefix can be provided to PCF in step 7, and the IP address/prefix notification in this step can be skipped.

Step 9: PCF may provide updated policies to the SMF. The PCF may provide authorized Session-AMBR and the authorized 5QI and ARP to SMF.

As explained earlier and later in the present document, the PCC Rules sent from the PCF to the SMF may include the QVER Rule. Step 10: If Request Type indicates "initial request", the SMF initiates an N4 Session Establishment procedure with the selected UPF, otherwise it initiates an N4 Session Modification procedure with the selected UPF:

10*a*: The SMF sends an N4 Session Establishment/Modification Request to the UPF and provides Packet detection, enforcement and reporting rules to be installed on the UPF for this PDU Session. If CN Tunnel Info is allocated by the SMF, the CN Tunnel Info is provided to UPF in this step. If the selective User Plane deactivation is required for this PDU Session, the SMF determine the Inactivity Timer and it provides to the UPF. If the timestamp is required for ingress (incoming) and/or egress (outgoing) PDU, the SMF provides the indication to add Timestamp to Ingress PDU and/or Timestamp to Egress PDU as one of parameters to the UPF.

As explained earlier and later in the present document, the N4 Session Establishment/Modification Request sent from the SMF to the UPF may include the QVER Rule. If the QVER Rule includes packet delay reporting and/or packet delay violation event, and/or PER violation event, and/or MDBV violation event, the UPF may add timestamp to the PDUs indicating the time the PDUs arrive and/or leave the UPF. The UPF sends the PDUs with timestamp(s) toward the (R)AN node over the N3 or N9 interface. 10*b*: The UPF acknowledges by sending an N4 Session Establishment/Modification Response. If CN Tunnel Info is allocated by the UPF, the CN Tunnel Info is provided to SMF in this step.

If multiple UPFs are selected for the PDU Session, the SMF initiate N4 Session Establishment/Modification procedure with each UPF of the PDU Session in this step.

If the Request Type indicates "Existing PDU Session", and the SMF creates CN Tunnel Info, then this step is skipped. Otherwise, this step is performed to obtain the CN Tunnel Info from the UPF using the N4 Session Modification Procedure. Step 11: SMF to AMF: Namf_Communication_N1N2MessageTransfer (PDU Session ID, Access Type, N2 SM information (PDU Session ID, QFI(s), QoS Profile(s), CN Tunnel Info, S-NSSAI, Session-AMBR, PDU Session Type), N1 SM container (PDU Session Establishment Accept (QoS Rule(s), selected SSC mode, S-NSSAI, allocated IPv4 address, interface identifier, Session-AMBR, selected PDU Session Type))). In case of multiple UPFs are used for the PDU Session, the CN tunnel Info contain tunnel information related with the UPF that terminates N3.

The N2 SM information carries information that the AMF may forward to the (R)AN which includes:

The CN Tunnel Info corresponds to the Core Network address of the N3 tunnel corresponding to the PDU Session.

One or multiple QoS profiles and the corresponding QFIs can be provided to the (R)AN. This is further described in TS 23.501 [2] clause 5.7.

The PDU Session ID may be used by AN signaling with the UE to indicate to the UE the association between AN resources and a PDU Session for the UE.

A PDU Session is associated to an S-NSSAI and a DNN.

The N1 SM container contains the PDU Session Establishment Accept that the AMF may provide to the UE.

Multiple QoS Rules and QoS Profiles may be included in the PDU Session Establishment Accept within the N1 SM and in the N2 SM information.

The Namf_Communication_N1N2MessageTransfer further contains the PDU Session ID and information allowing the AMF to know which access towards the UE to use.

NOTE 5: The access information is to deal with the case where a UE is simultaneously connected over 3GPP and Non 3GPP access.

As introduced earlier and later in the present document, the N2 SM message sent from the SMF to the (R)AN may include the QVER Rule. The N1 SM message sent from the SMF to the UE may including QVER Rule.

Step 12: AMF to (R)AN: N2 PDU Session Request (N2 SM information, NAS message (PDU Session ID, N1 SM container (PDU Session Establishment Accept))).

The AMF sends the NAS message containing PDU Session ID and PDU Session Establishment Accept targeted to the UE and the N2 SM information received from the SMF within the N2 PDU Session Request to the (R)AN.

As introduced earlier and later in the present document, the message sent from the SMF to the (R)AN may include the QVER Rule. If the QVER Rule includes packet delay reporting, and/or packet delay violation event, and/or PER violation event, and/or MDBV violation event, the (R)AN may add timestamp to the DL and/or UL PDUs indicating the time(s) the PDUs arrives and/or leaves the (R)AN. The (R)AN sends the PDUs with timestamp(s) toward the PSA UPF node over the N3 or N9 interface.

Step 13: (R)AN to UE: The (R)AN may issue AN specific signaling exchange with the UE that is related with the information received from SMF. For example, in case of a 3GPP (R)AN, an RRC Connection Reconfiguration may take place with the UE establishing the necessary (R)AN resources related to the QoS Rules for the PDU Session request received in step 12.

(R)AN also allocates (R)AN N3 tunnel information for the PDU Session. In case of Dual Connectivity, the Master (R)AN node may assign some (zero or more) QFIs to be setup to a Master (R)AN node and others to the Secondary (R)AN node. The AN Tunnel Info includes a tunnel endpoint for each involved (R)AN node, and the QFIs assigned to each tunnel endpoint. A QFI can be assigned to either the Master (R)AN node or the Secondary (R)AN node and not to both.

(R)AN forwards the NAS message (PDU Session ID, N1 SM container (PDU Session Establishment Accept)) provided in step 12 to the UE. (R)AN may only provide the NAS message to the UE if the necessary (R)AN resources are established and the allocation of (R)AN tunnel information are successful.

As introduced earlier and later in the present document, the message sent from the SMF to the UE may include the QVER Rule. If the QVER Rule includes packet delay reporting, and/or packet delay violation event, and/or PER violation event, and/or MDBV violation event, the UE may add timestamp to the PDUs indicating the time the PDUs arrives and/or leaves the UE. The UE sends the PDU with timestamp(s) toward the (R)AN node over the air interface Uu. The UE may read the timestamp(s) of the DL PDU(s) to calculate the end-to-end packet delay between the PSA UPF and/or the delay of RAN between the (R)AN node and the UE.

Step 14: (R)AN to AMF: N2 PDU Session Response (PDU Session ID, Cause, N2 SM information (PDU Session ID, AN Tunnel Info, List of accepted/rejected QFI(s))).

The AN Tunnel Info corresponds to the Access Network address of the N3 tunnel corresponding to the PDU Session.

Step 15: AMF to SMF: Nsmf_PDUSession_UpdateSMContext Request (N2 SM information, Request Type).

The AMF forwards the N2 SM information received from (R)AN to the SMF.

If the list of rejected QFI(s) is included in N2 SM information, the SMF may release the rejected QFI(s) associated QoS profiles.

Step 16a: The SMF initiates an N4 Session Modification procedure with the UPF. The SMF provides AN Tunnel Info to the UPF as well as the corresponding forwarding rules.

As introduced earlier and later in the present document, the message sent from the SMF to the UPF may include the QVER Rule. If the QVER Rule includes packet delay reporting, and/or packet delay violation event, and/or PER violation event, and/or MDBV violation event, the UPF may add timestamp to the PDUs indicating the time the PDUs arrives and/or leaves the UPF. The UPF sends the PDU with timestamp(s) toward the (R)AN node over the N3 or N9 interface. NOTE 6: If the PDU Session Establishment Request was due to mobility between 3GPP and non-3GPP access or mobility from EPC, the downlink data path is switched towards the target access in this step.

Step 16b: The UPF provides an N4 Session Modification Response to the SMF.

If multiple UPFs are used in the PDU Session, the UPF in step 16 refers to the UPF terminating N3.

Step 17: SMF to AMF: Nsmf_PDUSession_UpdateSMContext Response (Cause).

The SMF may subscribe to the UE mobility event notification from the AMF (e.g. location reporting, UE moving into or out of area of interest), after this step by invoking Namf_EventExposure_Subscribe service operation as specified in clause 5.2.2.3.2 of TS 23.502. For LADN, the SMF subscribes to the UE moving into or out of LADN service area event notification by providing the LADN DNN as an indicator for the area of interest (see clause 5.6.5 and 5.6.11 of TS 23.501 [2]).

After this step, the AMF forwards relevant events subscribed by the SMF.

Step 18: [Conditional] SMF to AMF: Nsmf_PDUSession_ SMContextStatusNotify (Release)

If during the procedure, any time after step 5, the PDU Session establishment is not successful, the SMF informs the AMF by invoking Nsmf_PDUSession_ SMContextStatusNotify(Release). The SMF also releases any N4 session(s) created, any PDU Session address if allocated (e.g IP address) and releases the association with PCF, if any.

Step 19: SMF to UE, via UPF: In case of PDU Type IPv6, the SMF generates an IPv6 Router Advertisement and sends it to the UE via N4 and the UPF.

Step 20: If the PDU Session cannot be established, then the SMF may perform the following:
a) The SMF unsubscribes to the modifications of Session Management Subscription data for the corresponding (SUPI, DNN, S-NSSAI), using Nudm_SDM_Unsubscribe (SUPI, DNN, S-NSSAI), if the SMF is no more handling a PDU Session of the UE for this (DNN, S-NSSAI).
b) The SMF deregisters for the given PDU Session using Nudm_UECM_Deregistration (SUPI, DNN, PDU Session ID).

UE-Requested PDU Session Establishment for Home-Routed Roaming Scenarios

Figure 10A:
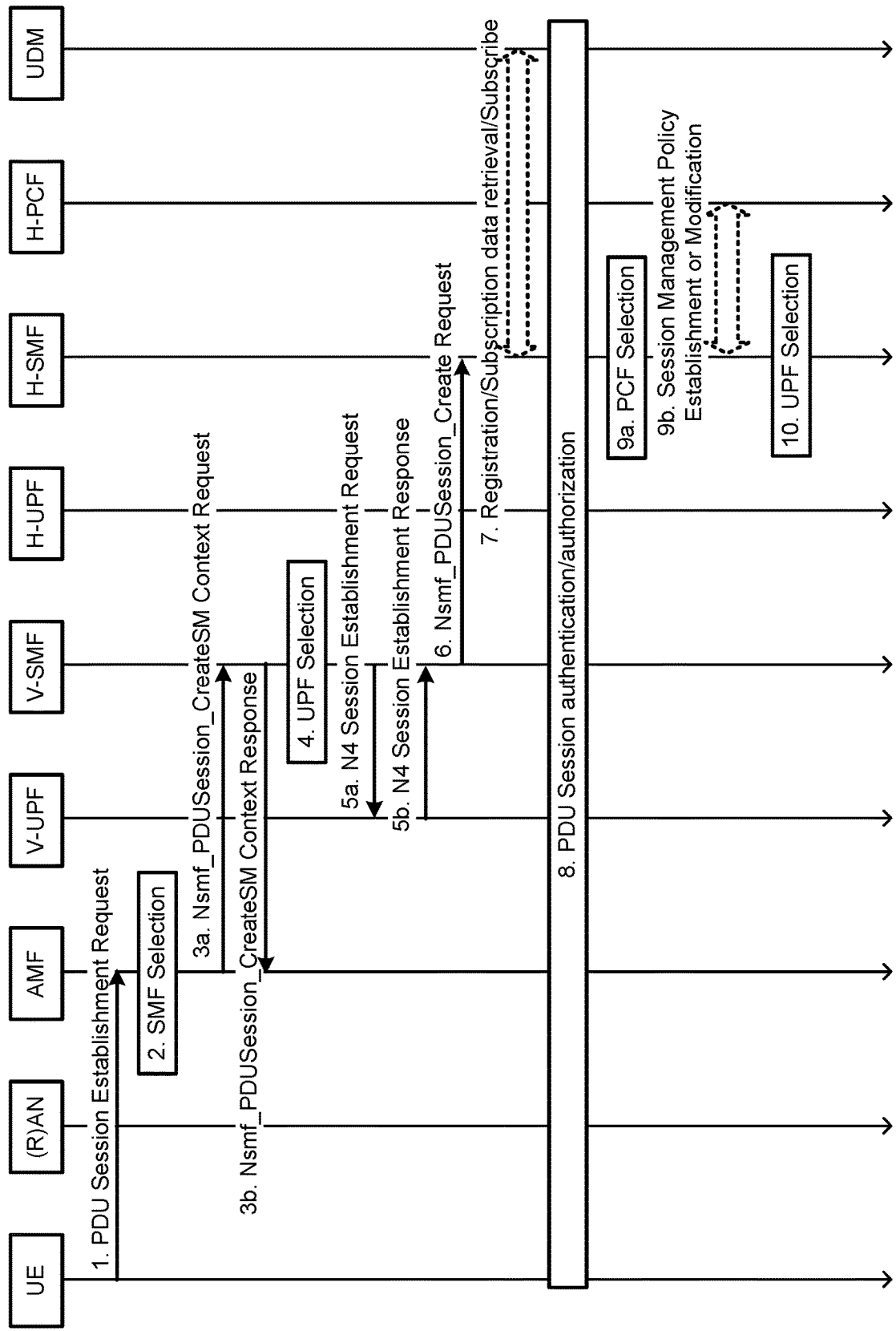
FIGS. 10A-10C show a message flow diagram illustrating a representative process for UE-requested PDU Session Establishment for home-routed roaming scenarios, which may be used in embodiments of the present invention.
Figure 10B:
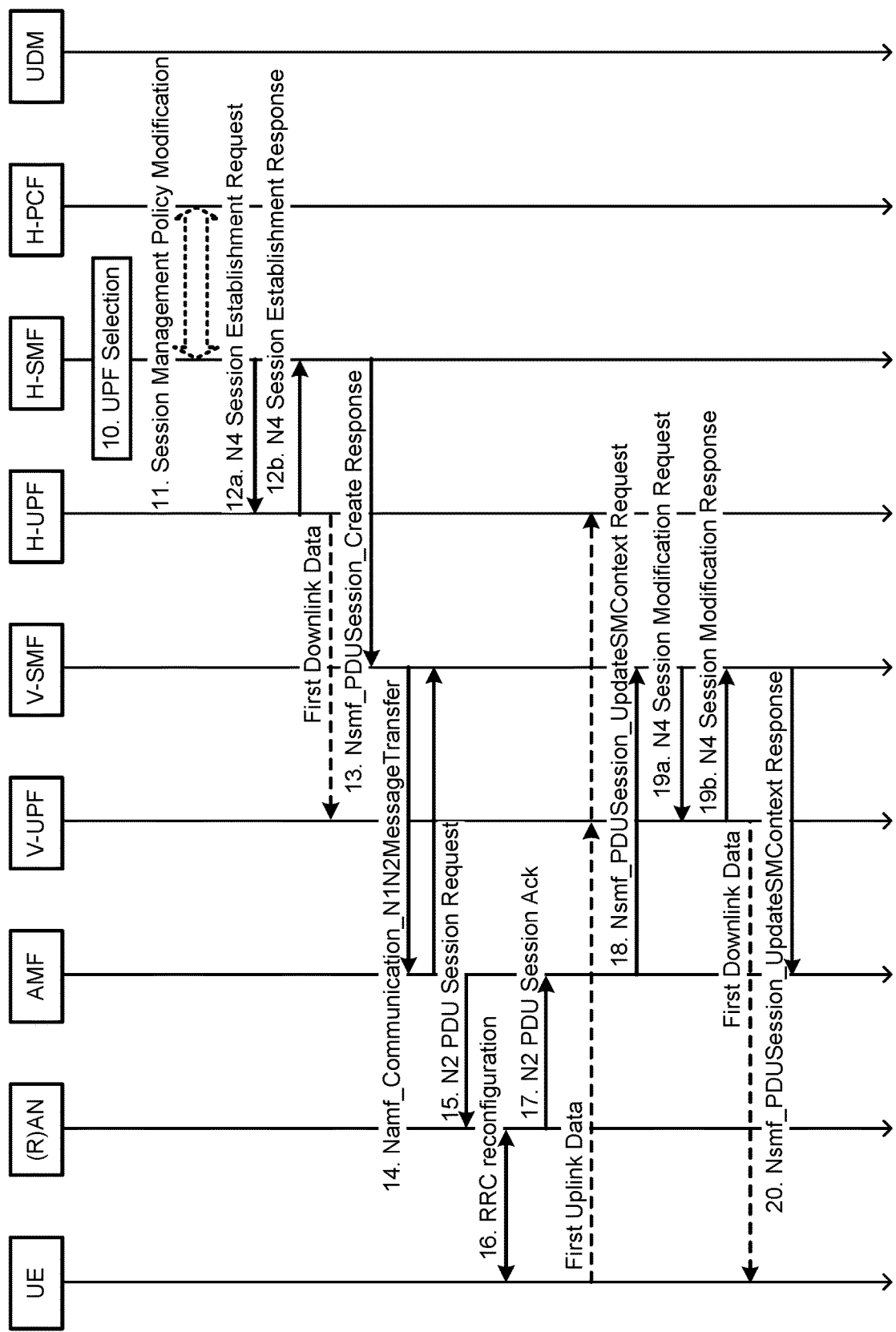
Figure 10C:
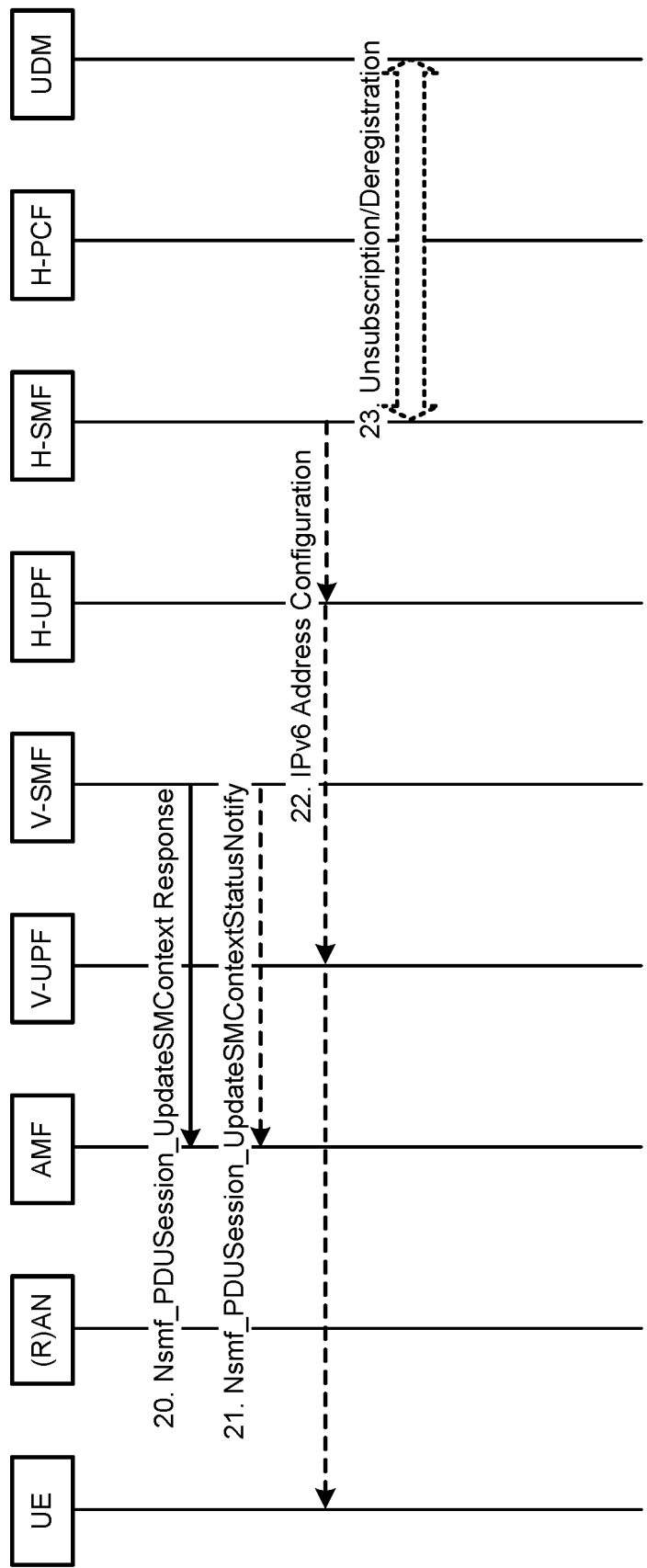

FIGS. 10A-10C illustrate a representative process for UE-requested PDU Session Establishment for home-routed roaming scenarios.

Step 1: This step is the same as step 1 of FIGS. 9A-9B.

Step 2: As in step 2 of FIGS. 9A-9B with the addition that the AMF also selects a SMF in HPLMN using the S-NSSAI with the value defined by the HPLMN, as described in clause 4.3.2.2.3. The AMF stores the association of the S-NSSAI, the DNN, the PDU Session ID and the SMF ID in VPLMN.

In step 3 of FIGS. 9A-9B, in local breakout roaming case, if V-SMF responds to AMF indicating that V-SMF is not able to process some part of the N1 SM information, the AMF proceeds with home routed case from this step and may select an SMF in the VPLMN different from the V-SMF selected earlier.

Step 3a: As in step 3 of FIGS. 9A-9B with the addition that the AMF also provides the identity of the SMF in HPLMN it has selected in step 2 and the S-NSSAI with the value defined by the HPLMN. The H-SMF is provided when the PDU Session is home-routed. The N1 SM container contains the PDU Session Establishment Request received from the UE. GPSI may be provided to the V-SMF by the AMF if available at AMF.

3b: This step is the same as step 5 of FIGS. 9A-9B.

Step 4: The V-SMF selects a UPF in VPLMN as described in TS 23.501 [2], clause 6.3.3.

In Step 5 The V-SMF initiates an N4 Session Establishment procedure with the selected V-UPF:
5a: The V-SMF sends an N4 Session Establishment Request to the V-UPF. If CN Tunnel Info is allocated by the SMF, the CN Tunnel Info is provided to V-UPF in this step. If the timestamp is required for ingress (incoming) and/or egress (outgoing) PDU, the V-SMF provides an indication to add the Timestamp to Ingress PDU and/or Timestamp to Egress PDU as one of parameters to the V-UPF.
5b: The V-UPF acknowledges by sending an N4 Session Establishment Response. If CN Tunnel Info is allocated by the V-UPF, the CN Tunnel Info is provided to V-SMF in this step.

As introduced earlier and later in the present document, the message sent from the V-SMF to the V-UPF may include the QVER Rule. If the QVER Rule includes packet delay reporting, and/or packet delay violation event, and/or PER violation event, and/or MDBV violation event, the V-UPF may add timestamp to the PDUs indicating the time the PDUs arrives and/or leaves the V-UPF. The V-UPF may send the PDUs with timestamp(s) toward the (R)AN node over the N3 or N9 interface. The V-UPF may send the PDUs with timestamp(s) toward the H-UPF.

Step 6: V-SMF to H-SMF: Nsmf_PDUSession_Create Request (SUPI, GPSI (if available), DNN, S-NSSAI with the value defined by the HPLMN, PDU Session ID, V-SMF ID, V-CN-Tunnel-Info, PDU type, Protocol Configuration Options, User location information, SM PDU DN Request Container). Protocol Configuration Options may contain information that H-SMF may needs to properly establish the PDU Session (e.g. SSC mode or SM PDU DN Request Container to be used to authenticate the UE by the DN-AAA as defined in clause 4.3.2.3).

Steps 7-12a, 12b: These steps are the same as steps 4-10 in FIGS. 9A-9B with the following differences:
  These steps are executed in Home PLMN;
  The H-SMF stores an association of the PDU Session and V-SMF ID for this PDU Session for this UE.
  The H-SMF does not provides the Inactivity Timer to the H-UPF as described in step 9a in clause 4.3.2.2.1.
  Step 5 of FIGS. 9A-9B is not executed.
  As introduced earlier and later in the present document, the message sent from the H-SMF to the H-UPF may include the QVER Rule. If the QVER Rule includes packet delay reporting, and/or packet delay violation event, and/or PER violation event, and/or MDBV violation event, the H-UPF may add timestamp to the PDUs indicating the time the PDUs arrives and/or leaves the H-UPF. The H-UPF may sends the PDUs with timestamp(s) toward the V-UPF.

Step 13: H-SMF to V-SMF: Nsmf_PDUSession_Create Response (QoS Rule(s), Protocol Configuration Options including session level information that the V-SMF is not expected to understand, selected PDU Session Type and SSC mode, H-CN Tunnel Info, QFI(s), QoS profile(s), Session-AMBR, information needed by V-SMF in case of EPS interworking such as the PDN Connection Type)
  The information that the H-SMF may provide is the same as that defined for step 11 of FIGS. 9A-9B.
  The H-CN Tunnel Info contains the tunnel information for uplink traffic towards H-UPF.
  Multiple QoS Rules may be included in the Nsmf_P-DUSession_Create Response.

Steps 14-18: These steps are the same as steps 11-15 FIGS. 9A-9B with the following differences:
  These steps are executed in Visited PLMN;
  The V-SMF stores an association of the PDU Session and H-SMF ID for this PDU Session for this UE.

19a: The V-SMF initiates an N4 Session Modification procedure with the V-UPF. The V-SMF provides Packet detection, enforcement and reporting rules to be installed on the V-UPF for this PDU Session, including AN Tunnel Info, H-CN Tunnel Info and V-CN Tunnel Info. If the timestamp is required for measuring packet delay for ingress (incoming) and/or egress (outgoing) PDU, the V-SMF provides the PCC rule that includes an indication that the Timestamp to be added to the Ingress PDU and Timestamp to be added to the Egress PDU as one of parameters to the V-UPF.

Step 19b: The V-UPF provides a N4 Session Modification Response to the V-SMF.
  After this step, the V-UPF delivers any down-link packets to the UE that may have been buffered for this PDU Session.
  The message sent from the V-SMF to the V-UPF may include the QVER Rule. If the QVER Rule includes packet delay reporting, and/or packet delay violation event, and/or PER violation event, and/or MDBV violation event, the V-UPF may add timestamp to the PDUs indicating the time the PDUs arrives and/or leaves the V-UPF. The V-UPF may send the PDUs with timestamp(s) toward the (R)AN node over the N3 or N9 interface. The V-UPF may send the PDUs with timestamp(s) toward the H-UPF.

Step 20: This step is the same as step 17 in FIGS. 9A-9B. with the following differences:
  The SMF is a V-SMF
Step 21: This step is same as step 18 in FIGS. 9A-9B.

Step 22: H-SMF to UE, via H-UPF and V-UPF in VPLMN: In case of PDU Type IPv6, the H-SMF generates an IPv6 Router Advertisement and sends it to the UE via N4 and the H-UPF and V-UPF.

Step 23: This step is the same as step 20 in FIGS. 9A-9B with the difference that this step is executed in the Home PLMN.

NOTE: The SMF in HPLMN can initiate step 21 already after step 13.

UE or Network Requested PDU Session Modification (Non-Roaming and Roaming with Local Breakout)

Figure 11A:
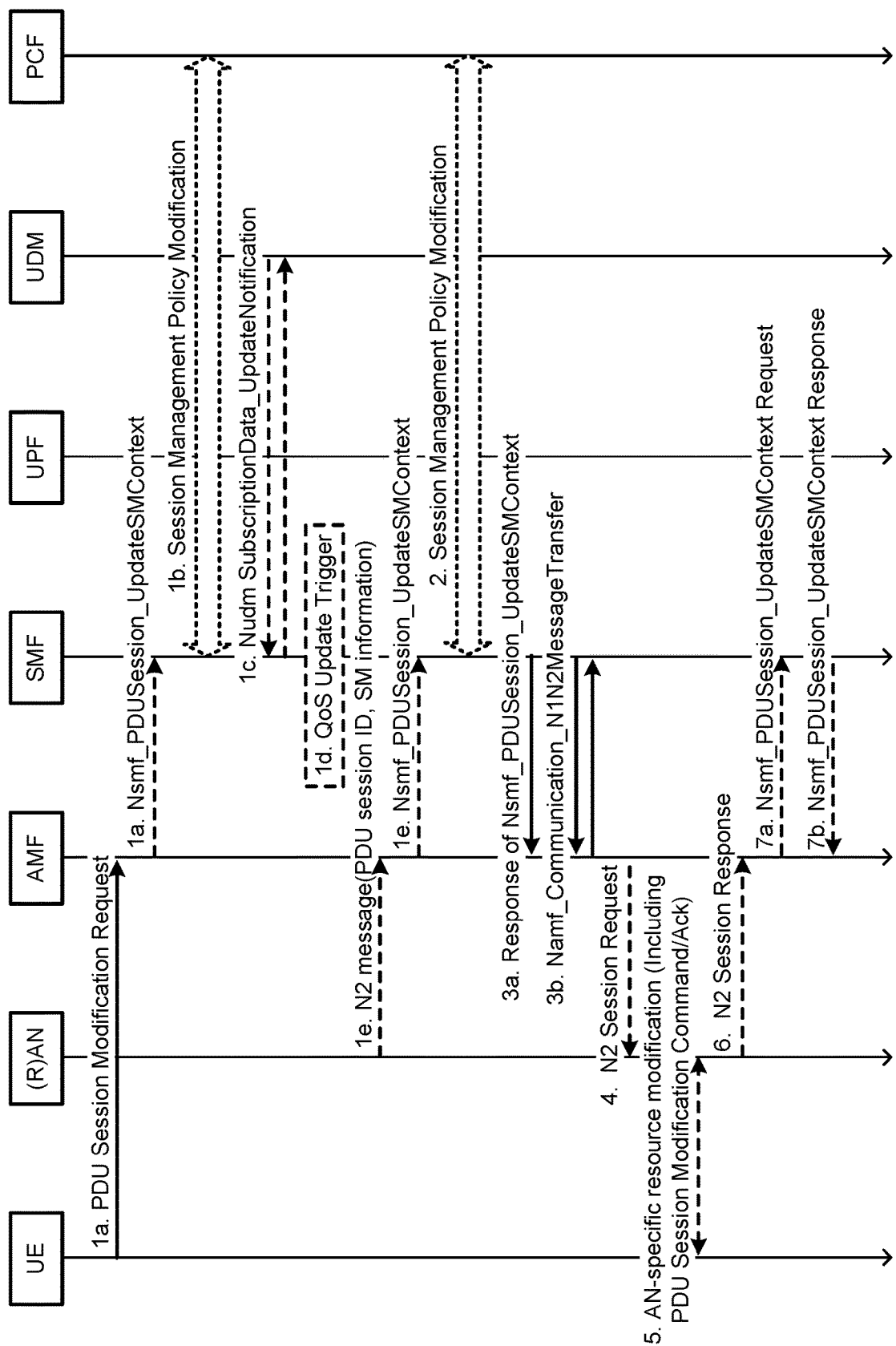
FIGS. 11A-11B show a message flow diagram illustrating a representative process for UE or network requested PDU Session Modification procedure (non-roaming and roaming with local breakout), which may be used in embodiments of the present invention.
Figure 11B:
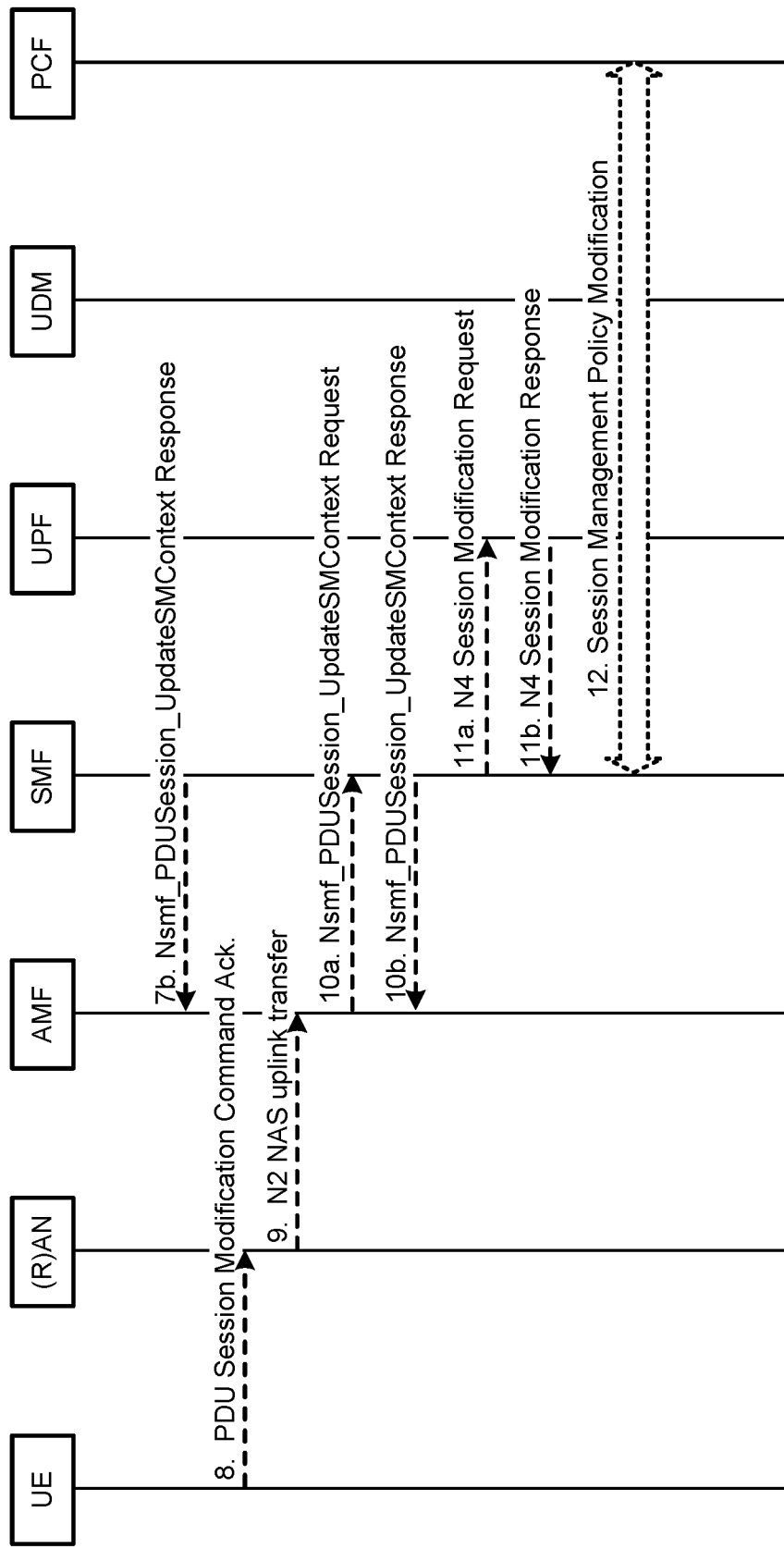

FIGS. 11A and 11B illustrate UE or network requested PDU Session Modification procedure (non-roaming and roaming with local breakout).

Step 1: The procedure may be triggered by following events:
  1a: (UE initiated modification) The UE initiates the PDU Session Modification procedure by the transmission of an NAS message (N1 SM container (PDU Session Modification Request(Packet Filters, Operation, Requested QoS, Segregation)), PDU Session ID) message. Depending on the Access Type, if the UE was in CM-IDLE state, this SM-NAS message is preceded by the Service Request procedure. The NAS message is forwarded by the (R)AN to the AMF with an indication of User location Information. The AMF invokes Nsmf_PDUSession_UpdateSMContex (PDU Session ID, N1 SM container (PDU Session Modification Request)).

When the UE requests specific QoS handling for selected SDF(s), the PDU Session Modification Request includes Packet Filters describing the SDF(s), the requested Operation (add, modify, delete), the Requested QoS and optionally a Segregation indication. The Segregation indication is included when the UE recommends to the network to bind the applicable SDF(s) on a distinct and dedicated QoS Flow e.g. even if an existing QoS Flow can support the requested QoS. The network should abide by the UE request, but is allowed to proceed instead with binding the selected SDF(s) on an existing QoS Flow.

NOTE 1: Only one QoS Flow is used for traffic segregation. If UE makes subsequent requests for segregation of additional SDF(s), the additional SDF(s) are multiplexed on the existing QoS Flow that is used for segregation.

The UE may not trigger a PDU Session Modification procedure for a PDU Session corresponding to a LADN when the UE is outside the area of availability of the LADN.

1b: (SMF requested modification) The PCF performs a Session Management Policy Modification procedure as defined in clause 4.16.5 of 3GPP TS 23.502 to notify SMF about the modification of policies. This may e.g.; have been triggered by a policy decision or upon AF requests.

The AF may request the PCF to the report the QoS violated events. The PCF may send QVER Rule to the SMF.

1c: (SMF requested modification) The UDM updates the subscription data of SMF by Nudm_Subscriber-Data_UpdateNotification (SUPI, Subscription Data). The SMF updates the Subscription Data and acknowledges the UDM by returning an Ack with (SUPI).

1d: (SMF requested modification) The SMF may decide to modify PDU Session. This procedure also may be triggered based on locally configured policy or triggered from the (R)AN (see clause 4.2.6).

If the SMF receives one of the triggers in step 1b-1d, the SMF starts SMF requested PDU Session Modification procedure.

1e: (AN initiated modification) (R)AN may indicate to the SMF when the AN resources onto which a QoS flow is mapped are released. (R)AN sends the N2 message (PDU Session ID, N2 SM information) to the AMF. The N2 SM information includes the QFI, User location Information and an indication that the QoS Flow is released. The AMF invokes Nsmf_PDUSession_UpdateSMContext (N2 SM information).

(AN initiated notification control) In case notification control is configured for a GBR Flow, (R)AN sends a N2 message (PDU Session ID, N2 SM information) to SMF when the (R)AN decides the QoS targets of the QoS Flow cannot be fulfilled. The N2 SM information includes the QFI indicating that the QoS targets for that QoS flow cannot be fulfilled. The AMF invokes Nsmf_PDUSession_UpdateSMContext (N2 SM information). If the PCF has subscribed to the event, SMF reports this event to the PCF for each PCC Rule for which notification control is set, see step 2. Alternatively, if dynamic PCC does not apply for this DNN, and dependent on locally configured policy, the SMF may start SMF requested PDU Session Modification procedure, see step 3b.

Step 2: The SMF may need to report some subscribed event to the PCF by performing a Session Management Policy Modification procedure as defined in clause 4.16.5. The PCF may provide new policy information to the SMF. This step may be skipped if PDU Session Modification procedure is triggered by step 1b or 1d. If dynamic PCC is not deployed, the SMF may apply local policy to decide whether to change the QoS profile.

Steps 3 to 7 are not invoked when the PDU Session Modification requires only action at an UPF (e.g. gating).

Step 3a: For UE or AN initiated modification, the SMF responds to the AMF through Nsmf_PDUSession_UpdateSMContext (N2 SM information (PDU Session ID, QFI(s), QoS Profile(s), Session-AMBR), N1 SM container (PDU Session Modification Command (PDU Session ID, QoS rule(s), QoS rule operation, Session-AMBR))). See TS 23.501 [2] clause 5.7 for the QoS Profile and QoS rule.

The N2 SM information carries information that the AMF may provide to the (R)AN. It may include the QoS profiles and the corresponding QFIs to notify the (R)AN that one or more QoS flows were added or modified. It may include only QFI(s) to notify the (R)AN that one or more QoS flows were removed. If the PDU Session Modification was triggered by the (R)AN Release in step 1d the N2 SM information carries an acknowledgment of the (R)AN Release. If the PDU Session Modification was requested by the UE for a PDU Session that has no established User Plane resources, the N2 SM information provided to the (R)AN includes information for establishment of User Plane resources.

The SMF may send the QVER Rule to the (R)AN in the N2 SM information message.

The N1 SM container carries the PDU Session Modification Command that the AMF may provide to the UE. It may include the QoS rules and corresponding QoS rule operation to notify the UE that one or more QoS rules were added, removed or modified.

The SMF may send the QVER Rule to the UE in the N1 SM container.

Step 3b: For SMF requested modification, the SMF invokes Namf_Communication_N1N2MessageTransfer (N2 SM information (PDU Session ID, QFI(s), QoS Profile(s), Session-AMBR), N1 SM container (PDU Session Modification Command (PDU Session ID, QoS rule(s), QoS rule operation, Session-AMBR))).

The SMF may send the QVER Rule to the (R)AN in the N2 SM information message. The SMF may send the QVER Rule to the UE in the N1 SM container.

If the UE is in CM-IDLE state and an ATC is activated, the AMF updates and stores the UE context based on the Namf_Communication_N1N2MessageTransfer and steps 4, 5, 6 and 7 are skipped. When the UE is reachable e.g. when the UE enters CM-CONNECTED state, the AMF forwards the N1 message to synchronize the UE context with the UE.

Step 4: The AMF may send N2 PDU Session Request (N2 SM information received from SMF, NAS message (PDU Session ID, N1 SM container (PDU Session Modification Command))) Message to the (R)AN.

Step 5: The (R)AN may issue AN specific signaling exchange with the UE that is related with the information received from SMF. For example, in case of a 3GPP (R)AN, an RRC Connection Reconfiguration may take place with the UE modifying the necessary (R)AN resources related to the PDU Session.

Step 6: The (R)AN may acknowledge N2 PDU Session Request by sending a N2 PDU Session Ack (N2 SM information (List of accepted/rejected QFI(s), AN Tunnel Info, PDU Session ID), User location Information) Message to the AMF. In case of Dual Connectivity, if one or more QFIs were added to the PDU Session, the Master (R)AN node may assign one or more of these QFIs to a (R)AN node which was not involved in the PDU Session earlier; In this case the AN Tunnel Info includes a new N3 tunnel endpoint for QFIs assigned to the new (R)AN node. Correspondingly, if one or more QFIs were removed from the PDU Session, a (R)AN node may not be involved in the PDU Session anymore, and the corresponding tunnel endpoint is removed from the AN Tunnel Info.

Step 7: The AMF forwards the N2 SM information and the User location Information received from the AN to the SMF via Nsmf_PDUSession_UpdateSMContext service operation. The SMF replies with a Nsmf_PDUSession_UpdateSMContext Response.

Step 8: The UE acknowledges the PDU Session Modification Command by sending a NAS message (PDU Session ID, N1 SM container (PDU Session Modification Command Ack)) message.

Step 9: The (R)AN forwards the NAS message to the AMF.

Step 10: The AMF forwards the N1 SM container (PDU Session Modification Command Ack) and User Location Information received from the AN to the SMF via Nsmf_PDUSession_UpdateSMContext service operation. The SMF replies with a Nsmf_PDUSession_UpdateSMContext Response.

Step 11: The SMF may update N4 session of the UPF(s) that are involved by the PDU Session Modification by sending N4 Session Modification Request (N4 Session ID) message to the UPF. For a PDU Session of Ethernet PDU Type, the SMF may notify the UPF to add or remove Ethernet Packet Filter Set(s) and forwarding rule(s). If the timestamp is required for ingress (incoming) and/or egress (outgoing) PDU, the SMF provides an indication to add the Timestamp to Ingress PDU and Timestamp to Egress PDU as one of parameters to the UPF.

The SMF may send the QVER Rule to the UPF in the N4 Session Modification Request.

NOTE 2: The UPF that are impacted in the PDU Session Modification procedure depends on the modified QoS parameters and on the deployment. For example in case of the session AMBR of a PDU Session with an UL CL changes, only the UL CL is involved.

Step 12: If the SMF interacted with the PCF in step 1b or 2, the SMF notifies the PCF whether the PCC decision could be enforced or not by performing a Session Management Policy Modification procedure as defined in clause 4.16.5.

SMF notifies any entity that has subscribed to User Location Information related with PDU Session change.

N4 Reporting Procedures

Figure 12:
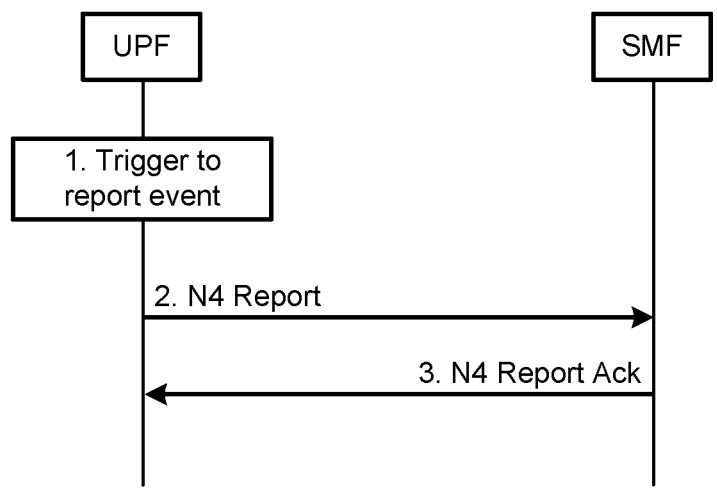
FIG. 12 is a message flow diagram illustrating a representative N4 reporting procedure, which may be used in embodiments of the present invention.

FIG. 12 illustrates a representative N4 reporting procedure used by the UPF to report events to the SMF.

This procedure is used by the UPF to report events related to an N4 session for an individual PDU Session. The triggers for event reporting were configured on the UPF during N4 Session Establishment/Modification procedures by the SMF.

Step 1: The UPF detects that an event has to be reported. The reporting triggers include the following cases:

(1) Usage report.
   Usage information may be collected in the UPF and reported to the SMF as defined in clause 5.8 and clause 5.12 of TS 23.501 [2].
(2) Start of traffic detection.
   When traffic detection is requested by SMF and the start of traffic is detected for a Packet Detection Rule (PDR) as described in clause 5.8 of TS 23.501 [2], the UPF may report the start of traffic detection to the SMF and indicate the corresponding PDR rule ID.
(3) Stop of traffic detection.
   When traffic detection is requested by SMF and the end of traffic is detected for a PDR as described in clause 5.8 of TS 23.501 [2], the UPF may report the stop of traffic detection to the SMF and indicate the corresponding PDR rule ID.
(4) Detection of 1st downlink data for UE in CM-IDLE state.
   When UPF receives the downlink packet but no N3/N9 tunnel for downlink data transmission exists and the buffering is performed by the UPF, it may report the detection of 1st downlink data to SMF for the purpose of downlink data notification. The UPF may also report the DSCP of the packet when instructed by SMF (e.g. in case the Paging Policy Differentiation feature described in clause of 5.4.3 of TS 23.501 [2] is enabled at the UPF).
(5) Detection of QoS violated events to the SMF. The SMF may configure the UPF how often the notification from UPF is forwarded to the PCF: immediately, periodically, or event-based, when the UP of PDU Session is deactivated, or when the PDU Session is released.
   the packet delay is larger than the UPF PDB;
   the measured data burst volume within a period of UPF PDB is larger than the Maximum Data Burst Volume; and the measured flow bitrate within the Averaging Window is larger than the MFBR;

the UPF cannot support the GFBR;

the measured Session-AMBR is larger than the authorized Session-AMBR;

the measured UE-AMBR is larger than the subscribed UE-AMBR;

a PDU is dropped; and a measured packet error rate (PER) is higher than the maximum PER given in the QoS PCC.

The SMF may request the UPF to add timestamp for packet delay measurements.

Step 2: The UPF sends an N4 report message (N4 Session ID, list of [Reporting trigger, Measurement information]) to the SMF.

The Reporting trigger parameter contains the name of the event which triggered the report and the Measurement information parameter contains the actual information that the SMF requested to be informed about. Step 3: The SMF identifies the N4 session context based on the received N4 Session ID and applies the reported information for the corresponding PDU Session. The SMF responds with an N4 report ACK message.

As described above, for QoS flows, such as delay critical GBR Flows, if configured, the PCEF may send a notification message to the SMF to report any of the following QoS violated events:

the packet delay is larger than the UPF PDB;

the measured data burst volume within a period of UPF PDB is larger than the Maximum Data Burst Volume;

the measured flow bitrate within the Averaging Window is larger than the MFBR;

the UPF cannot support the GFBR;

the measured Session-AMBR is larger than the authorized Session-AMBR;

the measured UE-AMBR is larger than the subscribed UE-AMBR a PDU is dropped; and a measured packet error rate (PER) is higher than the maximum PER given in the QoS PCC. According to the request from the SMF, the UPF or the PCEF of UPF may report packet delay measurement of individual PDU in the UL and/or DL of QoS flows, based on the timestamp(s) of received PDUs in the UL sent from the UE and/or (R)AN node. The UPF or the PCEF of UPF may report average packet delay of individual QoS flows, based on the individual packet delay measurements in the UL and/or DL.

The notification message may include any one or more of a time stamp of the event, the name of the violated QoS parameter, and the value of the measured violated parameter.

Policy and Charging Control Rule

To enable the enforcement in the 5GC of the policy decisions made by the PCF for the policy and charging control of a service data flow, the 5GC may provide 5G Policy and Charging Control information from the PCF to the SMF as described in table 1.

The differences with table 6.3 in TS 23.203 [4] are shown, either "none" means that the IE applies in 5GS or "removed" meaning that the IE does not apply in 5GS, this is due to the lack of support in the 5GS for this feature or "modified" meaning that the IE applies with some modifications defined in the IE.

TABLE 1

The PCC rule information in 5GC

| Information name | Description | Category | PCF permitted to modify for a dynamic PCC rule in the SMF | Differences compared with table 6.3. in TS 23.203 [4] |
|---|---|---|---|---|
| Rule identifier | Uniquely identifies the PCC rule, within a PDU Session. It is used between PCF and SMF for referencing PCC rules. | Mandatory | No | None |
| Service data flow detection | This part defines the method for detecting packets belonging to a service data flow. | | | |
| Precedence | Determines the order, in which the service data flow templates are applied at service data flow detection, enforcement and charging. (NOTE 1). | Conditional (NOTE 2) | Yes | None |
| Service data flow template | For IP PDU traffic: Either a list of service data flow filters or an application identifier that references the corresponding application detection filter for the detection of the service data flow. For Ethernet PDU traffic: Combination of traffic patterns of the Ethernet PDU traffic. It is defined in 3GPP TS 23.501 [2], clause 5.7.6.3 | Mandatory (NOTE 3) | Conditional (NOTE 4) | Modified (packet filters for Ethernet PDU traffic added) |
| Mute for notification | Defines whether application's start or stop notification is to be muted. | Conditional (NOTE 5) | No | None |
| Charging | This part defines identities and instructions for charging and accounting that is required for an access point where flow based charging is configured | | | |
| Charging key | The charging system (OCS or OFCS) uses the charging key to determine the tariff to apply to the service data flow. | | Yes | None |
| Service identifier | The identity of the service or service component the service data flow in a rule relates to. | | Yes | None |
| Sponsor Identifier | An identifier, provided from the AF which identifies the Sponsor, used for sponsored flows to correlate measurements from different users for accounting purposes. | Conditional (NOTE 6) | Yes | None |
| Application Service Provider Identifier | An identifier, provided from the AF which identifies the Application Service Provider, used for sponsored flows to correlate measurements from different users for accounting purposes. | Conditional (NOTE 6) | Yes | None |
| Charging method | Indicates the required charging method for the PCC rule. Values: online, offline or neither. | Conditional (NOTE 7) | No | None |
| Measurement method | Indicates whether the service data flow data volume, duration, combined volume/duration or event may be measured. This is applicable to reporting, if the charging method is online or offline. Note: Event based charging is only applicable to predefined PCC rules and PCC rules used for application detection filter (i.e. with an application identifier). | | Yes | None |

TABLE 1-continued

The PCC rule information in 5GC

| Information name | Description | Category | PCF permitted to modify for a dynamic PCC rule in the SMF | Differences compared with table 6.3. in TS 23.203 [4] |
|---|---|---|---|---|
| Application Function Record Information | An identifier, provided from the AF, correlating the measurement for the Charging key/Service identifier values in this PCC rule with application level reports. | | No | None |
| Service identifier level reporting | Indicates that separate usage reports may be generated for this Service identifier. Values: mandated or not required | | Yes | None |
| Policy control | This part defines how to apply policy control for the service data flow. | | | |
| Gate status | The gate status indicates whether the service data flow, detected by the service data flow template, may pass (Gate is open) or may be discarded (Gate is closed). | | Yes | None |
| 5G QoS identifier | Identifier for the authorized QoS parameters for the service data flow. | Conditional | Yes | Modified (corresponds to QCI in TS 23.203 [4]) |
| QoS Notification Control (QNC) | Indicates whether notifications are requested from 3GPP (R)AN when the GFBR can no longer (or again) be fulfilled for a QoS Flow during the lifetime of the QoS Flow. | Conditional | Yes | Added |
| QoS violated event Report | Indicates whether QoS violated events are requested from CN. | Conditional | Yes | Added |
| Frequency of QoS violated event Report | Indicates how often the QoS violated event Report is sent by (R)AN and UPF: : immediately, periodically, or event-based, when the UP of PDU Session is deactivated, when the PDU Session is released, when the UE enters CM-IDLE state (for (R)AN), when UE enters RRC-INACTIVE state (for (R)AN). | Conditional | Yes | Added |
| Reflective QoS Control | Indicates to apply reflective QoS for the SDF. | | Yes | Added |
| UL-maximum bitrate | The uplink maximum bitrate authorized for the service data flow | | Yes | None |
| DL-maximum bitrate | The downlink maximum bitrate authorized for the service data flow | | Yes | None |
| UL-guaranteed bitrate | The uplink guaranteed bitrate authorized for the service data flow | | Yes | None |
| DL-guaranteed bitrate | The downlink guaranteed bitrate authorized for the service data flow | | Yes | None |
| UL sharing indication | Indicates resource sharing in uplink direction with service data flows having the same value in their PCC rule | | No | None |
| DL sharing indication | Indicates resource sharing in downlink direction with service data flows having the same value in their PCC rule | | No | None |
| Redirect | Redirect state of the service data flow (enabled/disabled) | Conditional (NOTE 8) | Yes | None |
| Redirect Destination | Controlled Address to which the service data flow is redirected when redirect is enabled | Conditional (NOTE 9) | Yes | None |
| ARP | The Allocation and Retention Priority for the service data | Conditional (NOTE 10) | Yes | None |

TABLE 1-continued

| | The PCC rule information in 5GC | | | |
|---|---|---|---|---|
| Information name | Description | Category | PCF permitted to modify for a dynamic PCC rule in the SMF | Differences compared with table 6.3. in TS 23.203 [4] |
| | flow consisting of the priority level, the pre-emption capability and the pre-emption vulnerability | | | |
| Bind to QoS Flow associated with the default QoS rule | Indicates that the dynamic PCC rule may always have its binding with the QoS Flow associated with the default QoS rule. | Conditional (NOTE 11) | Yes | Modified (corresponds to bind to the default bearer in TS 23.203 [4]) |
| PS to CS session continuity | Indicates whether the service data flow is a candidate for vSRVCC. | | | Removed |
| Access Network Information Reporting | This part describes access network information to be reported for the PCC rule when the corresponding bearer is established, modified or terminated. | | | |
| User Location Report | The serving cell of the UE is to be reported. When the corresponding bearer is deactivated, and if available, information on when the UE was last known to be in that location is also to be reported. | | Yes | None |
| UE Timezone Report | The time zone of the UE is to be reported. | | Yes | None |
| Usage Monitoring Control | This part describes identities required for Usage Monitoring Control. | | | None |
| Monitoring key | The PCF uses the monitoring key to group services that share a common allowed usage. | | Yes | None |
| Indication of exclusion from session level monitoring | Indicates that the service data flow may be excluded from PDU Session usage monitoring | | Yes | None |
| Traffic Steering Enforcement Control | This part describes identities required for Traffic Steering Enforcement Control. | | | |
| Traffic steering policy identifier(s) | Reference to a pre-configured traffic steering policy at the SMF (NOTE 12). | | Yes | None |
| Data Network Access Identifier | Identifier of the target Data Network Access. It is defined in 3GPP TS 23.501 [2], clause 5.6.7. | | Yes | Added |
| Data Network Access Change report | Indicates whether a notification in case of change of DNAI at addition/change/removal of the UPF is requested, as well as the destination(s) for where to provide the notification. The notification information includes the target DNAI and an indication of early and/or late notification. It is defined in 3GPP TS 23.501 [2], clause 5.6.7 | | Yes | Added |

TABLE 1-continued

The PCC rule information in 5GC

| Information name | Description | Category | PCF permitted to modify for a dynamic PCC rule in the SMF | Differences compared with table 6.3. in TS 23.203 [4] |
| --- | --- | --- | --- | --- |
| NBIFOM related control Information | This part describes PCC rule information related with NBIFOM | | | |
| Allowed Access Type | The access to be used for traffic identified by the PCC rule | | | Removed |
| RAN support information | This part defines information supporting the (R)AN for e.g. handover threshold decision. | | | |
| UL Maximum Packet Loss Rate | The maximum rate for lost packets that can be tolerated in the uplink direction for the service data flow. It is defined in TS 23.501 [2], clause 5.7.2.8. | Conditional (NOTE 13) | Yes | None |
| DL Maximum Packet Loss Rate | The maximum rate for lost packets that can be tolerated in the downlink direction for the service data flow. It is defined in TS 23.501 [2], clause 5.7.2.8. | Conditional (NOTE 13) | Yes | None |

(NOTE 1):
For PCC rules based on an application detection filter, the precedence is only relevant for the enforcement, i.e. when multiple PCC rules overlap, only the enforcement, reporting of application starts and stops, monitoring, and charging actions of the PCC rule with the highest precedence may be applied.
(NOTE 2):
The Precedence is mandatory for PCC rules with SDF template containing SDF filter(s). For dynamic PCC rules with SDF template containing an application identifier, the precedence is either preconfigured in SMF or provided in the PCC rule from PCF.
(NOTE 3):
Either service data flow filter(s) or application identifier may be defined per each rule.
(NOTE 4):
YES, in case the service data flow template consists of a set of service data flow filters. NO in case the service data flow template consists of an application identifier
(NOTE 5):
Optional and applicable only if application identifier exists within the rule.
(NOTE 6):
Applicable to sponsored data connectivity.
(NOTE 7):
Mandatory if there is no default charging method for the PDU Session.
(NOTE 8):
Optional and applicable only if application identifier exists within the rule.
(NOTE 9):
If Redirect is enabled.
(NOTE 10):
Mandatory when policy control on SDF level applies.
(NOTE 11):
The presence of this attribute causes the 5QI/ARP/QNC of the rule to be ignored.
(NOTE 12):
The Traffic steering policy identifier can be different for uplink and downlink direction. If two Traffic steering policy identifiers are provided, then one is for uplink direction, while the other one is for downlink direction.
(NOTE 13):
Optional and applicable only for voice service data flow in this release.

The QoS violated event Report policy may include the list of QoS violated events, or the list of QoS parameters to be monitored and violated reported.

The QoS violated event Report may include timestamp of the event, NF type (e.g. (R)AN or UPF ID) (e.g. IP Address, FQDN), UE ID (e.g. SUPI, GPSI), PDU Session ID, QFI, the name of violated QoS parameter, and the measured value of violated QoS parameter. If the packet delay is larger than the PDB, the QoS violated event Report may include the packet size.

Event Exposure Using NEF
Monitoring Events

The Monitoring Events feature is intended for monitoring of specific events in 3GPP system and making such monitoring events information reported via the NEF. It is comprised of means that allow NFs in 5GS for configuring the specific events, the event detection, and the event reporting to the requested party.

To support monitoring features in roaming scenarios, a roaming agreement needs to be made between the HPLMN and the VPLMN. The set of capabilities required for monitoring may be accessible via NEF to NFs in 5GS. Monitoring Events via the UDM and the AMF enables NEF to configure a given Monitor Event at UDM or AMF, and reporting of the event via UDM and/or AMF. Depending on the specific monitoring event or information, it is either the AMF or the UDM that is aware of the monitoring event or information and makes it reported via the NEF.

The following table illustrates the monitoring events:

TABLE 3

List of event for monitoring capability

| Event | Description | Which NF detects the event |
| --- | --- | --- |
| Loss of Connectivity | Network detects that the UE is no longer reachable for either signalling or user plane communication. | AMF |
| UE reachability | It indicates when the UE becomes reachable for sending either SMS or downlink data to the UE, which is detected when the UE transitions to CONNECTED mode or when the UE will become reachable for paging, e.g., Periodic Registration Update timer. | AMF UDM: reachability for SMS |
| Location Reporting | It indicates either the Current Location or the Last Known Location of a UE. One-time and Continuous Location Reporting are supported for the Current Location. For Continuous Location Reporting the serving node(s) sends a notification every time it becomes aware of a location change, with the granularity depending on the accepted accuracy of location, (see NOTE 1) For One-time Reporting is supported only for the Last Known Location. | AMF |
| Change of SUPI-PEI association | It indicates a change of the ME's PEI (IMEI(SV)) that uses a specific subscription (SUPI) | UDM |
| Roaming status | It indicates UE's current roaming status (the serving PLMN and/or whether the UE is in its HPLMN) and notification when that status changes, (see NOTE 2) | UDM |
| Communication failure | It is identified by (R)AN/NAS release code | AMF |
| Availability after DNN failure | It indicates when there has been some data delivery failure followed by the UE becoming reachable. | AMF |
| Number of UEs present in a geographical area | It indicates the number of UEs that are in the geographic area described by the AF. The AF may ask for the UEs that the system knows by its normal operation to be within the area (Last Known Location) or the AF may request the system to also actively look for the UEs within the area (Current Location). | AMF |
| QoS violated event Report | Indicates the QoS violated events as described above | SMF |

(NOTE 1):
Location granularity for event request, or event report, or both could be at cell level (Cell ID), TA level or other formats e.g. shapes (e.g. polygons, circles, etc.) or civic addresses (e.g. streets, districts, etc.) which can be mapped by NEF.
(NOTE 2):
Roaming status means whether the UE is in HPLMN or VPLMN.

The QoS violated event report policy may include the list of QoS violated events, of the QoS parameters to be reported, such as packet delay, packet error rate, maximum data burst volume.

The QoS violated event Report may include a timestamp of the event, UE ID (e.g. SUPI, GPSI), PDU Session ID, QFI, the name of violated QoS parameter, and the measured value of violated QoS parameter. If the packet delay is larger than the PDB, the QoS violated event Report may include the packet size.

In the embodiments above, the UPF and (R)AN may receive instructions from the PCC rules from the PCF via SMF to add timestamp to the N3 and N9 tunnel header. In another embodiment, the timestamp can be added to the outer IP header. The UPF or (R)AN node send an instruction or an indication to the IP layer to add timestamp to the IP header, the timestamp can be inserted in the extension header field of the IP header. The instruction from the UPF or (R)AN can be an explicit instruction, or implicit instruction that is carried in one or more DSCP options that could trigger the IP router to add timestamp in the IP extension header. The timestamp option may be stored in the UE Context in the (R)AN or UPF.

The packets of QoS flows may be sent over two UP paths to improve the reliability. This method is called redundant packet transmission, in which the likelihood of QoS degradation will be reduced significantly. For example the packets of delay critical QoS flows, or QoS flows of URLLC applications, are often sent between a data source, such as an application server, and the UE over two data paths. The two data paths may be established between the application server and the UE, or between the PSA UPF and the UE, or between the PSA UPF and the (R)AN node, or between the (R)AN and the UE. The CP functions in the CN may be aware or establish the two transmission paths. The presented methods to monitor the QoS parameters, measuring the QoS parameters, reporting the QoS parameters, reporting QoS violated events can be applied to one of the two UP paths, or both UP paths. Since there are two UP paths, the reporting of QoS flows may be different for different packet redundant transmission scenarios.

The PCF may send the QoS monitoring and QoS reporting policy to the SMF, which may indicate which type of (radio) access technology ((R)AT), such as 3GPP RAT and non-3GPP RAT, to be monitored. The SMF may decide to monitor and report QoS parameters for one UP path or both UP paths.

If the two UP paths are established between the data source and the UE, the AF may request the CN to monitor and report QoS parameters, and/or QoS violation events of the two UP paths. The PCF or SMF may receive the requests of the AF to monitor the two UP paths. The AF may include information to identify the two UP paths, such as IP addresses of the QoS flows or IP addresses of the PDU sessions that send PDU over the two UP paths. The AF may include an indication that the two PDU sessions or two QoS flows serve the same data transaction of the UE. The two PDU Sessions or two QoS flows that serve the same data transaction may be serve by the same set of mobile network functions (such as the same AMF, the same PCF, the same SMF, the same UDM, the same UPF, the same (R)AN node), or different mobile network functions (such as different AMFs, and/or different PCFs, and/or different SMFs, and/or different UDMs, and/or different UPFs, and/or different (R)AN nodes). In any cases, the PCF(s) may send request(s) to the SMF(s) to monitor and report QoS parameters as presented early.

The PCF(s) may send response or notification to the AF that carry the measured QoS parameters, and/or QoS violated events. The UPF or (R)AN may report the UL and/or DL QoS parameters of one UP path, or two UP paths.

The (R)AN or UPF may select the best measured QoS parameters to report or notify the SMF. For example the UPF may report the smallest packet delay of the two UP paths, in the UL and/or DL, to the SMF.

In case the two UP paths are established between the PSA UPF and the UE, the same PCF and SMF may serve the PDU session. The PCF may request the SMF to monitor and report QoS performance of one or both UP paths. In case the QoS parameters of the two UPF paths are monitored and reported, the UPF may report a combined QoS parameters for the two UP paths. For example, for the packet delay monitoring, the UPF sends DL PDUs to the (R)AN(s) with time stamps, the (R)AN(s) may send message(s) over the N3 UL interface(s) to the UPF to report the PDU delay for the same PDU. The (R)AN may include the sequence number of the PDU, which is part of header of GTP-U protocol so that the SMF knows the packet delay reported for which previously sent PDU in the DL. In the UL, the (R)AN(s) may include the time stamp(s), which may indicate when the PDU was sent from the UE, and/or when the PDU is sent from the (R)AN node. When the UPF receives the UL PDU with time stamps, the UPF may combine the time stamps of the UL PDU to determine the UL packet delay, which is the smallest packet delay of the two UL paths. When the UPF receives the DL packet delay reports from the one or two (R)AN nodes, the UPF may determine the DL packet delay, which is the smallest packet delay of the two DL paths. The UPF may notify the SMF the packet delay of the UL, which is the smallest packet delay of the two UL paths. The UPF may notify the SMF the packet delay of the DL, which is the smallest packet delay of the two DL paths. The (R)AN(s) may also send the DL packet delay of the two DL UP paths to the SMF over the N2 interface. Alternatively, the (R)AN may select the smallest packet delay of the two DL paths as the packet delay of the PDU and send the packet delay to the SMF over the N2 interface.

In case the (R)AN establishes two data paths between the (R)AN node and the UE, and there is one UP path between the (R)AN node and the PSA UPF, the (R)AN may perform the packet delay measurements in the UL and DL for the two data paths between the (R)AN node and the UE. The (R)AN may select the smallest packet delay of the two data paths over the air interface as the packet delay over the air interface, for the UL and DL. The (R)AN may send the packet delay of the UL and DL to the UPF over the N3 UL interface, or to the SMF over the N2 SM interface.

In case there are two UP paths between the (R)AN node and the PSA UPF, the UPF may send a DL PDU to the two UP paths. The DL time stamp indicating the time the PDU arrived the UPF may be added to the DL N3 interface (or N9 interface in case an I-UPF is used) tunnel header of one or two UP paths that deliver DL PDU and require packet delay monitoring. The (R)AN node may send UL PDU to the two UP paths. The UL time stamp indicating the time the PDU arrived the (R)AN and/or time stamp indicating packet delay of the air interface, in the UL and/or DL, may be added to the UL N3 or N9 tunnel header of one or two UP paths that deliver UL PDU and require packet delay monitoring. The (R)AN node may also send DL packet delay of the monitored DL UP path(s) in the UL N3 or N9 interface that paired with the DL UP path. The (R)AN node may also send the packet delay of the two DL UP paths in one of the UL N3 interface (or N9 interface in case an I-UPF is used).

The (R)AN may send a message in the N3 UL interface towards the PSA UPF to inform the PSA UPF about the packet delay in the downlink and uplink. This message may carry one or more of following packet delay information: This message may carry one or more of following packet delay information: one or more indication to identify the PDU such as sequence number(s) of UL and/or DL PDU carried in the UL and/or DL N3 or N9 tunnel header, a copy of DL PDU, a copy of UL PDU, one or more time stamp indicating the time(s) the UL and/or DL PDU arrived at a UP entity, one or more time stamp indicating the time(s) the UL and/or DL PDU left a UP entity, one or more packet delay value indicating the packet delay of DL and/or UL PDU transferred between two UP entities, one or more packet delay value indicating the measured packet processing delay of DL and/or UL PDU in a UP entity, one or more packet delay measurement result indicating the measured packet delay of a network segment between any two UP entities was less than or equal to the assigned packet delay budget for this network segment, one or more packet delay measurement result indicating the measured packet delay of a network segment between two UP entities was greater than the assigned packet delay budget for this network segment. The UP entity could be one or more of following network entity: the PSA UPF, I-UPF, (R)AN node, and UE. In the packet delay report, the order of the time stamps, or the order of packet processing delay is the same as the order of the time stamps carried in the UL and/or DL tunnel header that carries the PDU so that the PSA UPF could map the packet delay report to the packet delay of network segments and/or the packet processing delay in each UP entity. The message may also explicitly carry the indication of network segment, for example CN segment, (R)AN segment, UP entity identifier and name, corresponding to the packet delay information. The (R)AN may send the same packet delay information to the SMF in the N2 interface towards the SMF serving the PDU Session.

PSA UPF may receive the packet delay information from the (R)AN and I-UPF(s), the PSA UPF uses this packet delay information to calculate the packet delay in DL and/or UL of the network segment between the PSA UPF and an I-UPF, between an I-UPF and another I-UPF, between an I-UPF and the (R)AN, between the PSA UPF and the PSA UPF and the (R)AN, between the (R)AN and the UE.

The PSA UPF may send a message towards the SMF, for example over the N2 interface, to inform or report the SMF about the packet delay information in the DL and UL. This message may carry one or more of following packet delay information: one or more indication to identify the PDU such as sequence number(s) of UL and/or DL PDU carried in the UL and/or DL N3 or N9 tunnel header, a copy of DL PDU, a copy of UL PDU, one or more time stamp indicating the time(s) the UL and/or DL PDU arrived at a UP entity, one or more time stamp indicating the time(s) the UL and/or DL PDU left a UP entity, one or more packet delay value indicating the packet delay of DL and/or UL PDU transferred between two UP entities, one or more packet delay value indicating the measured packet processing delay of DL and/or UL PDU in a UP entity, one or more packet delay measurement result indicating the measured packet delay of a network segment between any two UP entities was less than or equal to the assigned packet delay budget for this network segment, one or more packet delay measurement result indicating the measured packet delay of a network segment between two UP entities was greater than the assigned packet delay budget for this network segment. The UP entity could be one or more of following network entity: the PSA UPF, I-UPF, (R)AN node, and UE. In the packet delay report, the order of the time stamps, or the order of packet processing delay is the same as the order of the time stamps carried in the UL and/or DL tunnel header that carries the PDU so that the SMF could map the packet delay report to the packet delay of network segments and/or the packet processing delay in each UP entity. The message may also explicitly carry the indication of network segment, for example CN segment, (R)AN segment, UP ID, corresponding to the packet delay information.

The SMF may receive the packet delay information report from the (R)AN and/or the UPF. The SMF may calculate one or more of the following packet delay information: the packet delay between two UP entities, the packet processing delay of a UP entity, the packet delay of network segment such as CN and/or (R)AN segment, for the DL and UL.

If one or more of network function, such PCF, NWDAF, AF, requested or subscribed to receive packet delay information, the SMF may send to this NF the packet delay information received from the (R)AN and/or the UPF. The SMF may send to the requesting or subscribing NF one or more of following packet delay information: the calculated packet delay between two UP entities and identifiers of these two UP entities, the identifier of the UP entity and packet processing delay of this UP entity, the packet delay of network segment such as CN and/or (R)AN and/or whole network (between the PSA UPF and UE), for the DL and/or UL, one or more indication that the measured packet delay in a network segment is not greater than the PDB assigned to this network segment for the UL and/or DL, one or more indication that the measured packet delay in a network segment is greater than the PDB assigned to this network segment for the UL and/or DL.

In some embodiments, the AF may request or subscribe the PCF or SMF to receive notification for packet delay violated events. In this case, PCF may create QVER policy that requests the PSA UPF and/or (R)AN and/or UE to report the time stamp(s) indicating the time the PDU arrives or leaves a UP entity. The UP entity could be one or more of PSA UPF, (R)AN, and UE. Alternatively, the PCF may create QVER policy that requests the PSA UPF and/or (R)AN to report the end-to-end packet delay between the PSA UPF and UE, in the UL and/or DL. The PCF may create QVER policy and send to the SMF. The SMF sends the QVER policy to the UP entity, such as PSA UPF, I-UPF, (R)AN, UE. The UP entity follows the QVER policy and reports the packet delay information to the SMF. The SMF may send the packet delay information to the PCF and/or NWDAF. Based on the packet delay information received from the (R)AN and/or the PSA UPF, and/or the UE, the PCF or SMF may determine whether the DL and/or UL packet delay in the mobile network meets the PDB requirement or not. The PCF or SMF may only send the packet delay violation event notification to the AF when the end-to-end packet delay between the PSA UPF and the UE, in the UL and/or DL, is greater than the end-to-end PDB assigned for packet transferred between the PSA UPF and UE, in the DL and/or UL. This method may help to reduce a large number of signaling messages from the CN to the AF just to inform the AF that the packet delay in the mobile network meets the PDB requirement, while the details of packet delay information is still reported from the UP entity to the CP function(s) for further processing and/or data analytics.

In some embodiments, the AF may request or subscribe the PCF or SMF to receive notification for packet delay violated events. The AF may include in the request a packet delay threshold. The packet delay threshold may be greater, or equal, or larger than the end-to-end PDB. A packet delay violated event happens when the packet delay in the network, e.g. the packet delay between the PSA UPF and UE, is greater than the packet delay threshold. The mobile network may notify the AF packet delay violated events. In this case, the SMF may receive the packet delay reports, for example from the (R)AN and/or UP, for PDU transmission in the network. If the AF requests or subscribes to receive notification of the packet delay which is larger than the packet delay threshold, the SMF may send a notification to the AF, which may include the information described in the present document, including one or more of the value of packet delay, an indication of packet delay violated event indicating the packet delay was greater than the packet delay threshold, the time stamp, a copy of the packet, the UE location (indicated by for example the (R)AN ID, cell ID, geographical location, tracking area, registration area).

In another embodiment, the AF may request or subscribe the PCF or SMF to receive notification for packet delay violated events. The AF may include in the request one or more of following information: packet delay threshold, the time window to calculate the average packet delay. The packet delay threshold may be greater, or equal, or larger than the end-to-end PDB. If the time window is included in the message sent from the AF, the SMF may use this time window to calculate the average packet delay, in which the average packet delay of multiple packets reported within the time window is calculated. A packet delay violated event happens when the average packet delay in the network, e.g. the average packet delay between the PSA UPF and UE, is greater than the packet delay threshold. The mobile network may notify the AF packet delay violated events. In this case, the SMF may receive the packet delay reports, for example from the (R)AN and/or UP, for PDU transmission in the network. If the AF requests or subscribes to receive notification of the packet delay which is larger than the packet delay threshold, the SMF may send a notification to the AF, which may include the information described in the present document, including one or more of the value of packet delay, an indication of packet delay violated event indicating the packet delay was greater than the packet delay threshold, the time stamp, a copy of the packet, the UE location (indicated by for example the (R)AN ID, cell ID, geographical location, tracking area, registration area).

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method comprising:
receiving, by an access network (AN) node from a session management function (SMF), a request for monitoring Quality of Service (QoS) event associated with a packet delay;
receiving, by the AN node, an uplink protocol data unit (PDU) associated with a PDU session; and
sending, by the AN node to a user plane function (UPF) over more than one user plane (UP) path, a PDU including the uplink PDU, wherein the PDU further includes a timestamp indicating at which time point the PDU leaves the AN node;
wherein the packet delay is a duration between the time point indicated by the timestamp and a time point at which the PDU arrives at the UPF, and
monitoring the packet delay over each of the user plane (UP) paths and reporting the packet delay over each of the UP paths to the SMF.

2. The method according to claim 1, wherein the timestamp is associated with a determination on the packet delay associated with the QoS event which triggers a report of the packet delay to the SMF.

3. The method according to claim 1, wherein the QoS event includes that the duration exceeds a threshold.

4. The method according to claim 1, wherein the request is received during a PDU session establishment procedure associated with a UE from which the AN node receives the uplink PDU.

5. The method according to claim 1, wherein the request is received during a modification procedure associated with the PDU session, wherein the PDU session is associated with a UE from which the AN node receives the uplink PDU.

6. The method according to claim 1, wherein the UPF is a PDU session anchor (PSA) UPF associated with the PDU session.

7. A method comprising
receiving, by a user plane function (UPF) from a session management function (SMF), a request for monitoring a QoS event associated with a packet delay; and
receiving, by the UPF from an access network (AN) node over more than one user plane (UP) path, a protocol data unit (PDU) including an uplink PDU, wherein the PDU further includes a timestamp indicating at which time point the PDU leaves the AN node;
wherein the packet delay is a duration between the time point indicated by the timestamp and a time point at which the PDU arrives at the UPF; and
monitoring the packet delay over each of the user plane (UP) paths and reporting the packet delay over each of the UP paths to the SMF.

8. The method according to claim 7, wherein the method further comprises:
determining, by the UPF, whether the QoS event occurs according to the packet delay.

9. The method according to claim 8, wherein the method further comprises:
reporting, by the UPF, the packet delay if the QoS event occurs, wherein the QoS event includes that the packet delay associated with the time point indicated by the timestamp exceeds a threshold.

10. The method according to claim 7, wherein the method further comprises:
determining, by the UPF, the packet delay according to the time point indicated by the timestamp.

11. The method according to claim 7, wherein the request is received during a protocol data unit (PDU) session establishment procedure associated with a UE from which the AN node receives the uplink PDU.

12. The method according to claim 7, wherein the UPF is a PDU session anchor (PSA) UPF associated with the PDU session.

13. An apparatus comprising one or more processors coupled with a non-transitory computer-readable media storing instructions, that when executed by the one or more processors, cause the one or more processors to perform a method including:
receiving from a session management function (SMF), a request for monitoring a Quality of Service (QoS) event associated with a packet delay;
receiving an uplink protocol data unit (PDU) associated with a PDU session; and
sending to a user plane function (UPF) over more than one user plane (UP) path, a PDU including the uplink PDU, wherein the PDU further includes a timestamp indicating at which time point the PDU leaves the AN node;
wherein the packet delay is a duration between the time point indicated by the timestamp and a time point at which the PDU arrives at the UPF; and
monitoring the packet delay over each of the user plane (UP) paths and reporting the packet delay over each of the UP paths to the SMF.

14. The apparatus according to claim 13, wherein the timestamp is associated with a determination on the packet delay associated with the QoS event which triggers a report of the packet delay to the SMF.

15. The apparatus according to claim 13, wherein the QoS event includes that the duration exceeds a threshold.

16. The apparatus according to claim 13, wherein the request is received during a PDU session establishment procedure associated with a UE from which the AN node receives the uplink PDU.

17. The apparatus according to claim 13, wherein the request is received during a modification procedure associated with the PDU session, wherein the PDU session is associated with a UE from which the AN node receives the uplink PDU.

18. The apparatus according to claim 13, wherein the UPF is a PDU session anchor (PSA) UPF associated with the PDU session.

19. An apparatus comprising one or more processors coupled with a non-transitory computer-readable media storing instructions, that when executed by the one or more processors, cause the one or more processors to perform a method including:
receiving from a session management function (SMF), a request for monitoring a Quality of Service (QoS) event associated with a packet delay; and
receiving from an access network (AN) node over more than one user plane (UP) path, a protocol data unit (PDU) including an uplink PDU, wherein the PDU further includes a timestamp indicating at which time point the PDU leaves the AN node;

wherein the packet delay is a duration between the time point indicated by the timestamp and a time point at which the PDU arrives at the apparatus; and monitoring the packet delay over each of the user plane (UP) paths and reporting the packet delay over each of the UP paths to the SMF.

20. The apparatus according to claim 19, wherein the method further comprises:

determining whether the QoS event occurs according to the packet delay.

21. The apparatus according to claim 19, wherein the method further comprises:

reporting the packet delay if the QoS event occurs, wherein the QoS event includes that the packet delay associated with the time point indicated by the timestamp exceeds a threshold.

22. The apparatus according to claim 19, wherein the method further comprises:

determining the packet delay according to the time point indicated by the timestamp.

23. The apparatus according to claim 19, wherein the request is received during a protocol data unit (PDU) session establishment procedure associated with a UE from which the AN node receives the uplink PDU.

24. The apparatus according to claim 19, wherein the apparatus is a PDU session anchor (PSA) UPF associated with the PDU session.

\* \* \* \* \*